(12) United States Patent
Ohgose

(10) Patent No.: US 8,542,740 B2
(45) Date of Patent: Sep. 24, 2013

(54) IMAGE CODING APPARATUS AND METHOD FOR CONVERTING FIRST CODED DATA CODED INTO SECOND CODED DATA BASED ON PICTURE TYPE

(75) Inventor: Hideyuki Ohgose, Osaka (JP)

(73) Assignee: Panasonic Corporation, Osaka (JP)

( * ) Notice: Subject to any disclaimer, the term of this patent is extended or adjusted under 35 U.S.C. 154(b) by 1237 days.

(21) Appl. No.: 12/186,601

(22) Filed: Aug. 6, 2008

(65) Prior Publication Data

US 2009/0290642 A1 Nov. 26, 2009

(30) Foreign Application Priority Data

Aug. 7, 2007 (JP) .................................. 2007-205749

(51) Int. Cl.
*H04N 7/12* (2006.01)

(52) U.S. Cl.
USPC ...................................................... 375/240.16

(58) Field of Classification Search
USPC ........................................ 375/240.01, 240.02
IPC ........................................................ H04N 7/12
See application file for complete search history.

(56) References Cited

U.S. PATENT DOCUMENTS

| 7,447,265 | B2 * | 11/2008 | Ohira ........................ 375/240.16 |
| 7,933,335 | B2 * | 4/2011 | Ikeda et al. .............. 375/240.16 |
| 2003/0039311 | A1 | 2/2003 | Ohira | |
| 2005/0089098 | A1 | 4/2005 | Sato et al. | |

FOREIGN PATENT DOCUMENTS

| JP | 11-308617 | 11/1999 |
| JP | 2003-143609 | 5/2003 |
| JP | 2005-110083 | 4/2005 |

* cited by examiner

*Primary Examiner* — David Czekaj
*Assistant Examiner* — Tracy Li
(74) *Attorney, Agent, or Firm* — Wenderoth, Lind & Ponack, LLP

(57) ABSTRACT

Provided is an image coding apparatus including a decoding unit 102 decoding first coded data to generate a decoded picture and decoding information containing motion vectors and including a coding unit 104 coding, in a second coding scheme, the decoded picture generated by the decoding unit 102, to generate second coded data including a coded picture and coding information containing motion vectors. The image coding apparatus also includes a basic motion information generating unit 105 generating basic motion information from the decoding information or the coding information selected based on a coding condition indicating a picture type of a current decoded picture to be coded. The coding unit 104 also determines a search range for estimating motion vectors of the current decoded picture, according to the basic motion information, and estimates motion vectors of the current decoded picture in the determined search range.

17 Claims, 13 Drawing Sheets

IMAGE CODING APPARATUS AND METHOD FOR CONVERTING FIRST CODED DATA CODED INTO SECOND CODED DATA BASED ON PICTURE TYPE

BACKGROUND OF THE INVENTION (1) Field of the Invention

The present invention relates to an image coding apparatus and a method thereof, and particularly relates to an image coding apparatus and a method thereof for coding a picture which has been coded in a first coding scheme, in a second coding scheme.

(2) Description of the Related Art

In recent years, digital video recorders are increasingly popularized which digitalize streams of the Standard Definition Television (SDTV) such as the analog television broadcast, and compress-code them to be recorded on Hard Disk Drives (HDDs) and optical disks such as Digital Versatile Disk Random Access Memory (DVD-RAM) disks. Furthermore, digital video recorders have now begun to be commercialized which are capable of recording streams of the High Definition Television (HDTV) such as the satellite broadcast and the digital terrestrial high-definition television broadcast.

The streams transmitted in the HDTV broadcast are coded in the Moving Picture Experts Group (MPEG)-2 format. When the HDTV broadcast is recorded, it is recorded as the MPEG-2 streams. Alternatively, it is common to decode the images of the streams which have been coded in the MPEG-2 format; convert the decoded images into images having a size defined in the DVD standard; and code the resulting images in the MPEG-2 format before recording. Furthermore, there is also a method of coding, before recording, images of the streams which had been coded in the MPEG-2 format and then decoded, in the H.264 format with a higher coding efficiency compared to the MPEG-2 format. Coding in the H.264 format enables the recording of the HDTV images while suppressing image quality deterioration without changing the HDTV image size, even when the bit rate in the recording is lowered.

However, when coding in the H.264 format, the processing amount greatly increases since the H.264 standard, compared to the MPEG-2 standard, has a higher degree of freedom in motion compensation and there are more pictures which can be referred to.

Further, when coding high-definition (HD) images as in the HDTV broadcast, it is necessary to enlarge the search range in which motion estimation is performed, which in turn further increases the processing amount compared to the case of recording the SDTV broadcast.

The HDTV broadcast images are about six times larger in size than the SDTV broadcast images. Consequently, the recording of the HDTV broadcast even in the MPEG-2 format requires a search range having a size about six times larger than that in the case of recording the SDTV broadcast, in order to achieve about the same performance in the motion vector estimation as in the case of recording the SDTV broadcast.

In addition, compared to the case of recording (coding) the HDTV broadcast in the MPEG-2 format, recording (coding) the HDTV broadcast in the H.264 format requires a processing amount 36 times larger, since the number of macroblocks (MBs), the unit of coding, is six times greater.

Under the MPEG-2 standard, a maximum of two frames (four fields) can be referred to for motion compensation, whereas under the H.264 standard, a maximum of 16 pictures can be referred to. Therefore, the H.264 standard makes it possible to estimate more highly-accurate motion vectors than that in the MPEG-2 standard. However, under the H.264 standard, performing the motion vector estimation on every reference picture requires a processing amount eight times greater than that in the MPEG-2 standard. As described above, coding images in the H.264 format having a higher coding efficiency than the MPEG-2 format entails a problem that the processing amount becomes great compared to the case of coding pictures in the MPEG-2 format.

In view of such a problem, a coding method has been proposed for estimating accurate motion vectors even from narrowed search ranges (e.g. Patent Reference 1: Japanese Examined Patent Application Publication No. 11-308617).

The "digital image coder and motion vector detector used therefor" of the above mentioned Patent Reference 1 use, at the time of coding images, motion vector information of a previously coded picture for determining a search range for motion estimation.

However, in Patent Reference 1, using only the information of a previously coded picture to narrow the search range for the motion estimation makes it unable to follow the motion of the entire picture when an object in the picture suddenly moves in an opposite direction and/or moves at an accelerated speed, and thus, the accuracy of motion vector estimation deteriorates. Moreover, since the motion vector estimated by the accuracy-deteriorated motion estimation is used for determining a search range for further motion estimation, the search range is narrowed based on incorrect information, causing a further deterioration in the motion estimation accuracy. As a result, it is impossible to narrow the search range sufficiently.

SUMMARY OF THE INVENTION

The present invention has been conceived in view of the problems set forth above, and it is an object of the present invention to provide an image coding apparatus and an image coding method capable of coding images by estimating highly accurate motion vectors while reducing the processing amount.

In order to achieve the above mentioned object, the image coding apparatus according to the present invention is an image coding apparatus which converts first coded data coded in a first coding scheme into second coded data coded in a second coding scheme, the apparatus comprising: a decoding unit configured to decode the first coded data to generate a decoded picture and decoding information containing motion vectors; a coding unit configured to code, in the second coding scheme, the decoded picture generated by the decoding unit, to generate the second coded data including a coded picture and coding information containing motion vectors; a decoding information holding unit configured to hold the decoding information generated by the decoding unit; a coding information holding unit configured to hold the coding information generated by the coding unit; and a basic motion information generating unit configured to select either the decoding information or the coding information based on a coding condition indicating a picture type of a current decoded picture to be coded by the coding unit, and to generate, from the selected information, basic motion information to be used by the coding unit for estimating motion vectors, wherein the coding unit is configured to (i) determine a search range according to the basic motion information generated by the basic motion information generating unit, (ii) estimate motion vectors of the current decoded picture in the determined search range, and (iii) generate the second coded data including the coded picture and coding information containing the estimated motion vectors.

Further, it may be that the basic motion information generating unit is configured to compute, from the motion vectors contained in the selected information, a representative vector representing the motion vectors, and to generate the basic motion information from the computed representative vector, and the coding unit is configured to determine, as a search range, a range pointed at by a motion indicated by the basic motion information.

With this configuration, selecting either the decoding information which was used for decoding the first coded data or the coding information which was used for coding the previous first coded data according to the picture type of the current decoded picture to be coded by the coding unit enables generation of basic motion information from plural motion vectors contained in the selected information, that is, the decoding information or the coded information, to be used for pointing at a more highly accurate search range, and thus, it is possible to estimate motion vectors effectively. In other words, it is possible to estimate highly accurate motion vectors even when the search range in which the motion vectors are estimated is narrowed to reduce the processing amount. As a result, it is possible to provide an image coding apparatus and an image coding method capable of coding images by estimating highly accurate motion vectors while reducing the processing amount.

Furthermore, it may be that the basic motion information generating unit is configured to select the decoding information held by the decoding information holding unit in the case where the coding condition indicates P picture as the picture type of the current decoded picture to be coded by the coding unit.

With this configuration, by selecting, when the picture type of the current decoded picture to be coded is P picture, motion vectors contained in the decoding information having less differences between the current decoded picture to be coded and a reference picture, it is possible to generate basic motion information used for pointing at a more highly accurate search range.

Furthermore, it may be that the basic motion information generating unit is configured to select the coding information held by the coding information holding unit in the case where the coding condition indicates B picture as the picture type of the current decoded picture to be coded by the coding unit.

With this configuration, by selecting, when the picture type of the current decoded picture to be coded is B picture, motion vectors contained in the coding information having fewer differences between the current decoded picture to be coded and a reference picture, it is possible to generate basic motion information used for pointing at a more highly accurate search range.

Moreover, it may be that the basic motion information generating unit includes: an average vector computing unit configured to (i) compute an average vector of the motion vectors each of which corresponds to a macroblock and is contained in the decoding information, (ii) compute an average vector of the motion vectors each of which corresponds to a macroblock and is contained in the coding information, and (iii) compute representative vectors from the computed respective average vectors; a picture-type determining unit configured to determine the picture type of the current decoded picture to be coded by the coding unit; and a selecting unit configured to select either the representative vector computed from the decoding information or the representative vector computed from the coding information, based on the determination by the picture-type determining unit, wherein the basic motion information generating unit is configured to generate the basic motion information from the representative vector selected by the selecting unit, the selected representative vector being computed from either the decoding information or the coding information.

With this configuration, selecting either the decoding information or the coding information according to the picture type of the current decoded picture to be coded by the coding unit enables generation of a representative vector, as basic motion information, which is computed from, and thus represents, plural motion vectors contained in the selected information, that is, the decoding information or the coded information. As a result, it is possible to generate basic motion information used for pointing at a more highly accurate search range.

Further, it may be that the coding information holding unit is configured to hold plural pieces of coding information each containing motion vectors of a decoded picture which has been coded prior to the current decoded picture to be coded by the coding unit, and the average vector computing unit is configured to compute the representative vector from one of the pieces of the coding information, held by the coding information holding unit, on a decoded picture coded immediately prior to the current decoded picture to be coded.

With this configuration, computing the representative vector from coding information of a picture immediately preceding the current decoded picture to be coded enables computation of motion vectors close to the motion vectors that need to be estimated for the current picture to be coded. As a result, it is possible to generate basic motion information used for pointing at a more highly accurate search range.

Furthermore, it may be that the average vector computing unit is configured to compute a representative vector from coding information on a decoded picture having a same picture type as the picture type of the current decoded picture to be coded, and coded by the coding unit immediately prior to the current decoded picture to be coded.

With this configuration, it is possible to compute, from the coding information, the representative vector representing motion vectors close to the motion vectors that need to be estimated for the current picture to be coded. As a result, it is possible to generate basic motion information used for pointing at a more highly accurate search range.

Further still, it may be that the average vector computing unit is configured to compute, from the coding information, an average vector of motion vectors for each of prediction directions of the current decoded picture to be coded by the coding unit, as the representative vector, the motion vectors each corresponding to a macroblock, and the representative vector contains a forward representative vector and a backward representative vector each of which is an average vector computed by the average vector computing unit for corresponding one of the prediction directions.

With this configuration, computing a representative vector representing motion vectors for each prediction direction enables computation of motion vectors close to the motion vectors that need to be estimated for the current picture to be coded. As a result, it is possible to generate basic motion information used for pointing at a more highly accurate search range.

Furthermore, it may be that the average vector computing unit is configured to compute, from the decoding information, an average vector of motion vectors in a forward direction of the current decoded picture to be coded by the coding unit, as the representative vector, each of the motion vectors corresponding to a macroblock.

With this configuration, computing a representative vector representing motion vectors in the forward direction enables computation of motion vectors close to the motion vectors that need to be estimated for the current picture to be coded. As a result, it is possible to generate basic motion information used for pointing at a more highly accurate search range.

Moreover, it may be that the average vector computing unit is configured to (i) compute an average vector using a base vector expressed in length and direction of a distance between one frame and another, in the case where the coding unit codes pictures having a frame structure, and (ii) compute an average vector using a base vector expressed in length and direction of a distance between one field and another, in the case where the coding unit codes pictures having a field structure.

With this configuration, it is possible to compute a motion vector representing motion vectors of respective macroblocks, regardless of whether the coding unit codes pictures in a frame structure or in a field structure.

Further, it may be that the average vector computing unit is configured to (i) divide the current decoded picture to be coded by the coding unit into two or more areas, (ii) compute, for each of the areas, an average value of the motion vectors computed from either the decoding information or the coding information, and (iii) treat a motion vector having a greatest average value among the computed average values, as the representative vector.

With this configuration, computing, as a second representative vector, an average vector which, among motion vectors of each area, best represents the motion of the motion vectors enables computation of motion vectors close to the motion vectors that need to be estimated for the current picture to be coded. As a result, it is possible to generate basic motion information used for pointing at a more highly accurate search range.

Furthermore, it may be that the average vector computing unit is configured to (i) divide the current decoded picture to be coded by the coding unit into two or more areas, (ii) compute, for each of the areas, an average value of the motion vectors computed from either the decoding information or the coding information, and (iii) treat a motion vector having a median value of the computed average values, as the representative vector.

With this configuration, computing, as a representative vector, an average vector which, among motion vectors of each area, best represents the motion of the motion vectors enables computation of motion vectors close to the motion vectors that need to be estimated for the current picture to be coded. As a result, it is possible to generate basic motion information used for pointing at a more highly accurate search range.

Furthermore, it may be that the average vector computing unit is configured to (i) divide the current decoded picture to be coded by the coding unit into two or more areas, (ii) classify average vectors, each of which is an average of motion vectors computed from either the decoding information or the coding information and which is computed for corresponding one of the areas, into groups by magnitude and direction of the average vectors, and (iii) treat a motion vector having an average value of average vectors in a group having a greatest number of average vectors, as the representative vector.

With this configuration, computing, as a representative vector, an average vector which, among the groups of average motion vectors, best represents the motion of the motion vectors enables computation of motion vectors close to the motion vectors that need to be estimated for the current picture to be coded. As a result, it is possible to generate basic motion information used for pointing at a more highly accurate search range.

Further, it may be that the average vector computing unit is configured to (i) divide the current decoded picture to be coded by the coding unit into two or more areas, (ii) classify, for each of the areas, the motion vectors into groups by magnitude and direction, the motion vectors being computed from either the decoding information or the coding information and each corresponding to a macroblock, (iii) compute an average vector for each of the groups, and (iv) treat an average vector of a group having a greatest number of motion vectors, as the representative vector.

With this configuration, motion vectors are grouped by magnitude and direction, and out of the average vectors computed for each group, the average vector of a group having the greatest number of motion vectors can be computed as the representative vector. As a result, it is possible to compute motion vectors close to the motion vectors that need to be estimated for the current picture to be coded, and to generate basic motion information used for pointing at a more highly accurate search range.

Furthermore, it may be that the coding unit is configured to compute, from the basic motion information, a sum of motion vectors between the current decoded picture to be coded and a reference picture, and to determine a search range for motion vector estimation for each of reference pictures such that a position shifted by the sum of the motion vectors is a center of the search range.

With this configuration, it is possible to generate basic motion information used for pointing at a more highly accurate search range.

It is to be noted that the present invention can be embodied not only as an apparatus, but also as: an integrated circuit having processing units included in such an apparatus; a method in which the processing units included in the apparatus are implemented as steps; and a program causing a computer to execute such steps. Moreover, such program, information, data and signals may be distributed via recording media such as CD-ROMs and via communication media such as the Internet.

According to the present invention, at the time of motion vector estimation, a search range for the motion estimation is determined based on decoding information of an input stream and on coding information used at the time of coding a previous picture, so that it is possible to estimate highly accurate motion vectors even when the search range for the motion estimation is narrowed for reduction of the processing amount. As a result, it is possible to provide an image coding apparatus and an image coding method capable of coding images by estimating highly accurate motion vectors while reducing the processing amount. Therefore, the present invention is highly practical for use today where the High Definition Television (HDTV) broadcast, such as satellite broadcast and digital terrestrial high-definition television broadcast, is increasingly popularized.

FURTHER INFORMATION ABOUT TECHNICAL BACKGROUND TO THIS APPLICATION

The disclosure of Japanese Patent Application No. 2007-205749 filed on Aug. 7, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Embodiment 1

Hereinafter, Embodiment 1 of the present invention shall be described with reference to the drawings.

Figure 1:
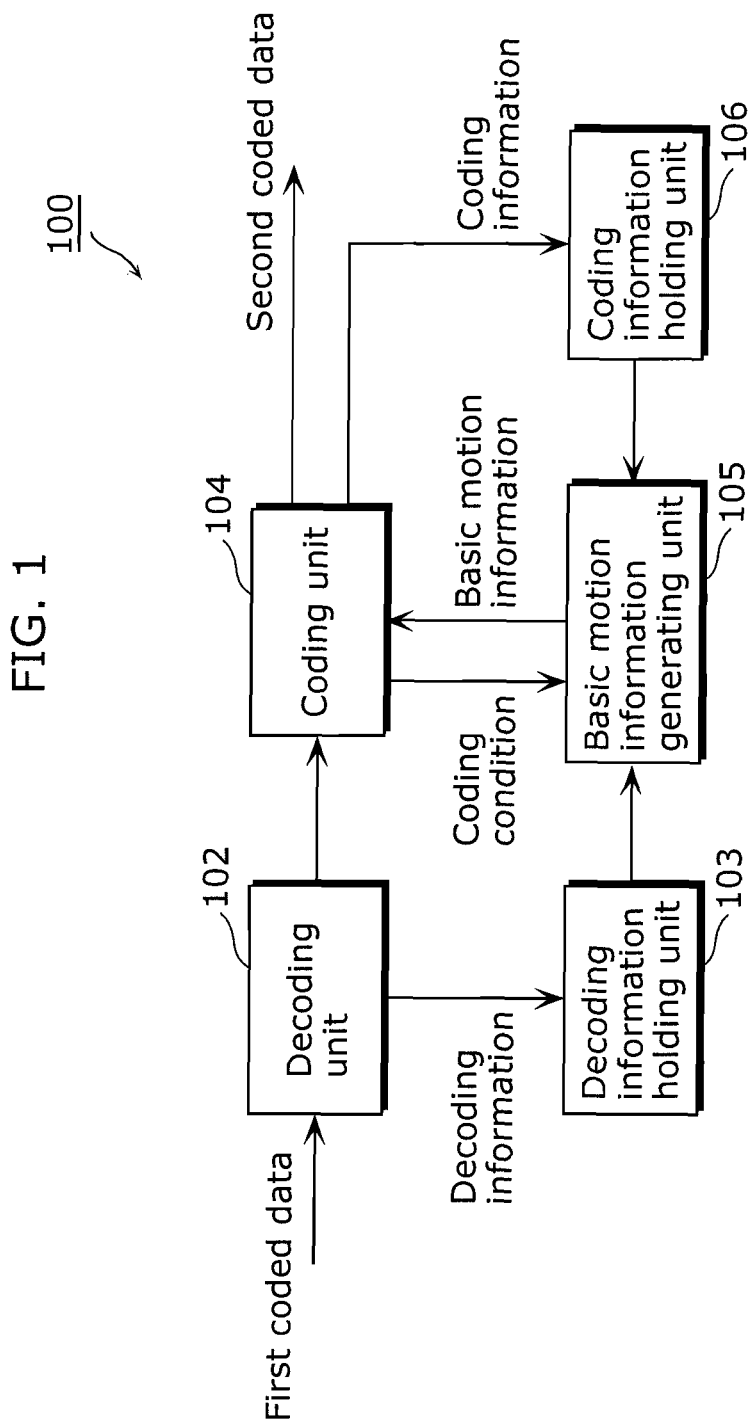
FIG. 1 is a block diagram showing the configuration of an image coding apparatus according to Embodiment 1 of the present invention.

FIG. 1 is a block diagram showing the configuration of an image coding apparatus 100. As FIG. 1 shows, the image coding apparatus 100 converts first coded data, which is coded in a first coding scheme, into second coded data coded in a second coding scheme. The image coding apparatus 100 includes a decoding unit 102, a decoding information holding unit 103, a coding unit 104, a basic motion information generating unit 105, and a coding information holding unit 106.

The following description assumes, as an example, that the first coded data is data coded in the MPEG-2 format, and the second coded data is data coded in the H.264 format. Further, in the following description, frames in frame-structured GOPs (Group of Pictures) are displayed in the following order: I, B, B, P, and fields in field-structured GOPs are displayed in the following order: I, I, B, B, B, B, P, P.

The decoding unit 102 is equivalent to the decoding unit of the present invention, and decodes the first coded data and generates a decoded picture and decoding information which contains motion vectors. To be more specific, the decoding unit 102 decodes the first coded data which has been inputted, in accordance with a syntax of the MPEG-2 standard. The syntax here is a rule concerning compress-coded data strings, and indicates a method for constructing a bit stream of coded data.

For decoding the first coded data, the decoding unit 102 extracts, from a stream of the first coded data, information on the entire sequence (e.g. sequence header), information on a GOP (GOP header), picture information (e.g. picture header), slice information (slice), and macroblock information (e.g. macroblock modes and motion information) (hereinafter referred to as decoding information). The decoding unit 102 generates a decoded picture by decoding the inputted first coded data based on the extracted decoding information. Further, the decoding unit 102 provides the extracted information to the decoding information holding unit 103 as decoding information.

Under the MPEG-2 standard, pictures are coded by employing inter-frame motion compensation, and thus the order of recording the coded pictures may become different from the order of display. The decoding unit 102, which codes pictures through conversion from the MPEG-2 format to the H.264 format, may rearrange the decoded pictures according to the display order before providing the same to the coding unit 104, or provide the decoded pictures to the coding unit 104 without changing the coding order. For example, when a picture recorded in the MPEG-2 format is to be coded in the 10H.264 format in the H.264 picture type equivalent to the picture type of the picture recorded in the MPEG-2 format, it is unnecessary for the decoding unit 102 to rearrange the pictures according to the display order, since about the same reference picture types will be used for motion prediction.

The decoding information holding unit 103 is equivalent to the decoding information holding unit of the present invention, and holds decoding information generated by the decoding unit. To be more specific, the decoding information holding unit 103 holds the decoding information extracted and provided by the decoding unit 102, in association with a corresponding decoded picture. The decoding information holding unit 103 forwards the decoding information associated with a corresponding decoded picture, to the basic motion information generating unit 105.

Under the H.264 standard, inter-frame motion compensation can be carried out with seven block sizes including the sizes of a macroblock, a block, and a sub-block, as in the MPEG-2 standard. Generally, block matching is performed with each of the above mentioned block sizes, and a block position and a block size are estimated which minimize an evaluation value such as a sum of absolute differences between a block to be coded and a reference picture. In other words, motion estimation is performed. The search range for the block matching is determined based on basic motion information.

The coding unit 104 is equivalent to the coding unit of the present invention, and codes a decoded picture, generated by the decoding unit, in the second coding scheme, and generates second coded data which includes a coded picture and coding information that contains motion vectors. Further, the coding unit 104 determines a search range according to the basic motion information generated by the basic motion information generating unit; estimates, in the determined search range, motion vectors of the decoded picture; and generates second coded data which includes a coded picture and coding information that contains the estimated motion vectors. To be more specific, the coding unit 104 codes, in the H.264 format, a decoded picture generated by and received from the decoding unit 102, and outputs, as second coded data, the decoded picture on which the coding was performed. Furthermore, the coding unit 104 provides the basic motion information generating unit 105 with a coding condition indicating e.g. a reference picture and the picture type of the current decoded picture to be coded. In addition, the coding unit 104 provides the coding information holding unit 106 with information containing luminance information and motion information such as a macroblock type, motion vector information, and quantized values used for coding the decoded picture (hereinafter referred to as coding information). It is to be noted that when coding a decoded picture, the coding unit 104 determines a search range for motion estimation based on the basic motion information generated from either the decoding information which was used by the decoding unit 102 when generating the current decoded picture to be coded or the coding information which was used by the coding unit 104 when coding a previous picture (a picture preceding the current decoded picture to be coded).

The coding information holding unit 106 is equivalent to the coding information holding unit of the present invention, and holds coding information generated by the coding unit. More specifically, the coding information holding unit 106 holds the coding information provided by the coding unit 104. The coding information held by the coding information holding unit 106 is used for coding pictures following the current picture.

The basic motion information generating unit 105 is equivalent to the basic motion information generating unit of the present invention, and selects either the decoding information or the coding information based on a coding condition indicating the picture type of the current decoded picture to be coded by the coding unit, and generates, from the selected information (either the coding information or the decoding information), basic motion information to be used by the coding unit for determining a search range for estimating motion vectors. Specifically, the basic motion information generating unit 105 selects, based on the coding condition indicating the picture type of the current decoded picture to be coded by the coding unit 104, either the decoding information on the current picture to be coded (decoded picture) or the coding information on a picture previously coded (picture preceding the current picture to be coded), and generates basic motion information indicating a motion in a picture, using the selected information, that is, using either the decoding information on the current picture to be coded (the decoded picture) or the coding information on the picture previously coded (the picture preceding the current picture to be coded). The basic motion information generating unit 105 computes a representative vector representing the motion vectors contained in the decoding information provided by the decoding information holding unit 103, and a representative vector representing the motion vectors contained in the coding information provided by the coding information holding unit 106. The basic motion information generating unit 105 selects either the representative vector representing the motion vectors contained in the decoding information or the representative vector representing the motion vectors contained in the coding information, based on the coding condition provided by the coding unit 104 indicating a picture type. The basic motion information generating unit 105 generates basic motion information based on the selected representative vector.

The basic motion information generated by the basic motion information generating unit 105 is used by the coding unit 104 in determining an area for searching for motion vectors when coding a current picture to be coded.

Figure 2:
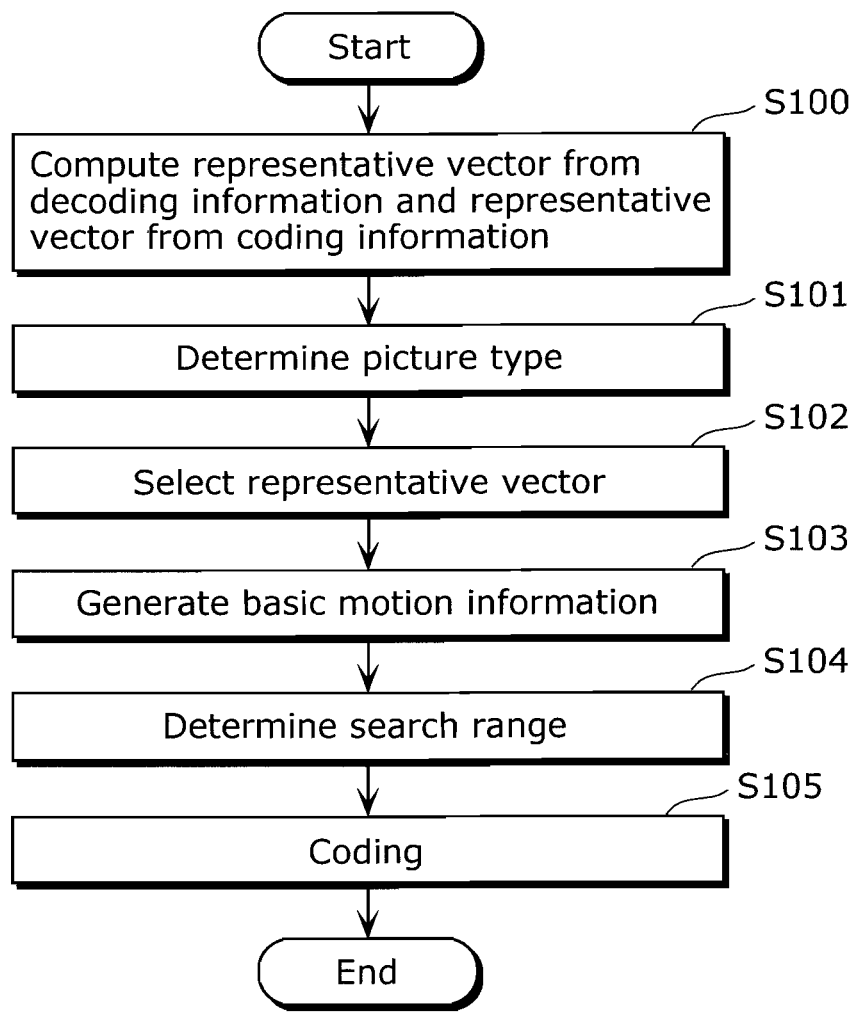
FIG. 2 is a flow chart for describing a process performed by the image coding apparatus according to Embodiment 1 of the present invention for coding images.

FIG. 2 is a flow chart for describing a process performed by the image coding apparatus 100 for coding images.

At first, the coding information holding unit 106 holds the coding information which was used by the coding unit 104 for coding a picture preceding the current decoded picture to be coded. Next, the decoding unit 102 decodes the current picture to be coded, and the decoding information holding unit 103 holds the decoding information which was used for decoding the current picture to be coded.

Next, the basic motion information generating unit 105 computes a representative vector representing the motion vectors contained in the decoding information provided by the decoding information holding unit 103, and a representative vector representing the motion vectors contained in the coding information provided by the coding information holding unit 106 (S100).

Next, the basic motion information generating unit 105 determines the picture type of the current decoded picture to be coded by the coding unit 104, according to a coding condition provided by the coding unit 104 indicating a picture type (S101).

Next, the basic motion information generating unit 105 selects either the representative vector representing the motion vectors contained in the decoding information or the representative vector representing the motion vectors contained in the coding information, based on the coding condition provided by the coding unit 104 (S102).

Next, the basic motion information generating unit 105 generates basic motion information based on the selected representative vector.

Next, the coding unit 104 determines a search range for carrying out motion estimation, based on the basic motion information generated by the basic motion information generating unit 105 (S104).

Next, the coding unit 104 estimates motion vectors in the search range determined based on the basic motion information, and codes the current picture to be coded using the coding information containing e.g. the estimated motion vectors and motion compensation.

The following shall describe how the basic motion information generating unit 105 generates basic motion information and how the coding unit 104 determines a search range.

First, the following shall describe how the basic motion information generating unit 105 generates basic motion information.

Figure 3:
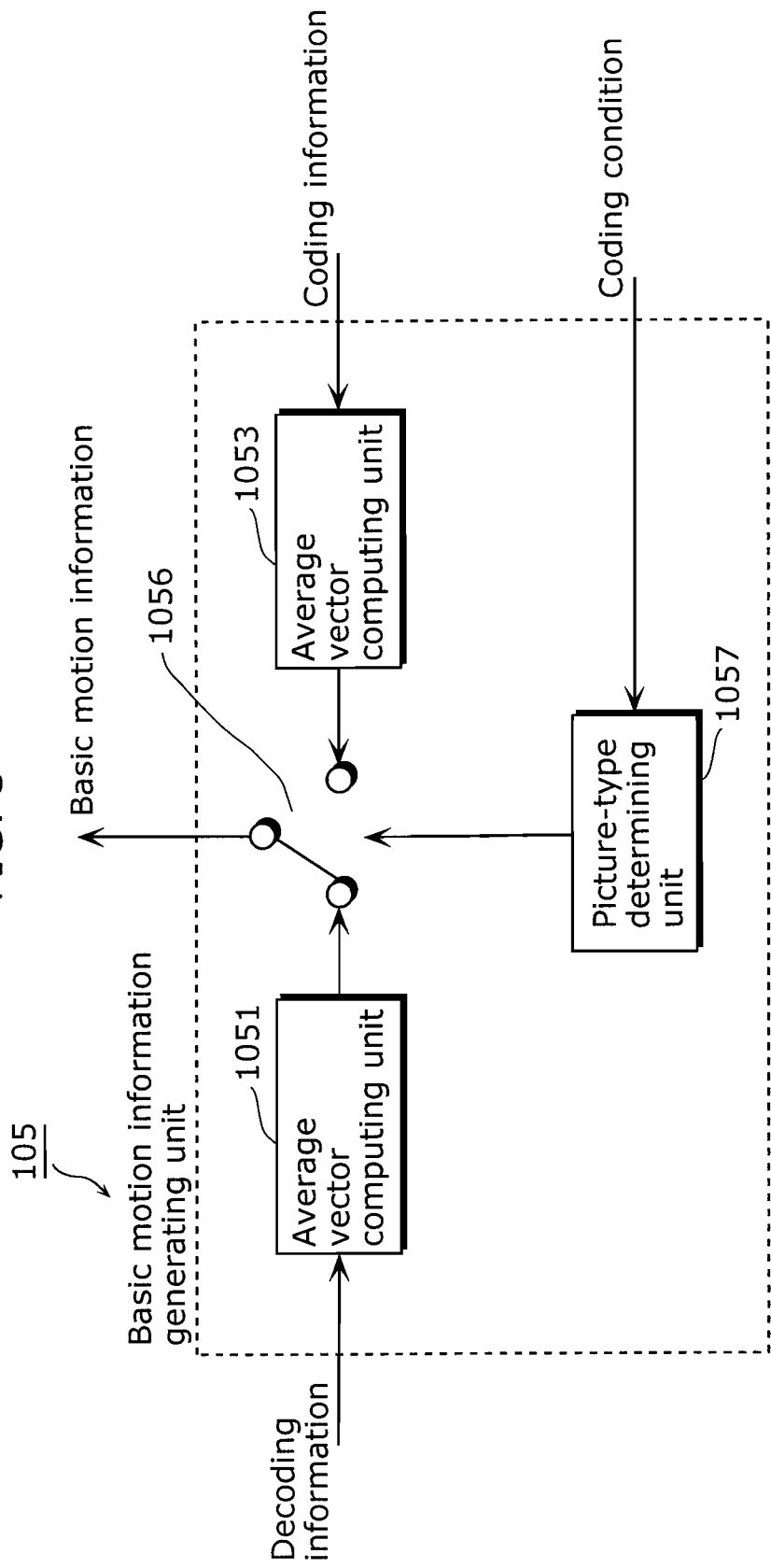
FIG. 3 is a block diagram showing the configuration of a basic motion information generating unit according to Embodiment 1 of the present invention.

FIG. 3 is a block diagram showing the configuration of the basic motion information generating unit 105.

The basic motion information generating unit 105 includes average vector computing units 1051 and 1053, a selector 1056, and a picture-type determining unit 1057.

The average vector computing unit 1051 is equivalent to the average vector computing unit of the present invention, and computes, from the decoding information provided by the decoding information holding unit 103, an average vector of motion vectors each of which corresponds to a macroblock, and then supplies the resultant to the selector 1056 as a representative vector.

The average vector computing unit 1053 is equivalent to the average vector computing unit of the present invention, and computes, from the coding information provided by the coding information holding unit 106, an average vector of motion vectors each of which corresponds to a macroblock, and then supplies the resultant to the selector 1056 as a representative vector.

The picture-type determining unit 1057 is equivalent to the picture-type determining unit of the present invention, and determines the picture type of the current decoded picture to be coded by the coding unit 104, according to the coding condition provided by the coding unit 104 indicating a picture type. The picture-type determining unit 1057 controls the selector 1056 so that it selects one of the representative vectors based on a predetermined selection criterion.

Here, the predetermined selection criterion shall be described. The selection criterion is that: the representative vector computed from the decoding information is selected in the case of determining, according to the coding condition received from the coding unit 104, P picture as the picture type of the current decoded picture to be coded by the coding unit 104; and the representative vector computed from the coding information is selected in the case of determining, according to the coding condition received from the coding unit 104, B picture as the picture type of the current decoded picture to be coded.

The selector 1056 is equivalent to the selecting unit of the present invention, controlled by the picture-type determining unit 1057, and selects either the representative vector derived from the decoding information by the average vector computing unit 1051, or the representative vector derived from the coding information by the average vector computing unit 1053. The representative vector selected by the selector 1056 is provided to the coding unit 104 as basic motion information.

The case described here is that the basic motion information generating unit 105 outputs a single vector as the basic motion information. Further, the first coded data and the second coded data here both have a frame structure.

Figure 4:
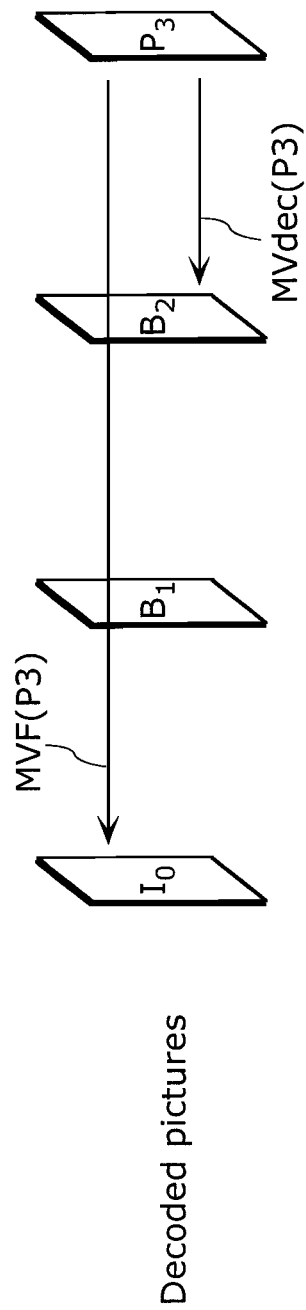
FIG. 4 is a diagram for describing how an average vector is computed from decoding information according to Embodiment 1 of the present invention.

FIG. 4 is a diagram for describing how an average vector is computed from decoding information. FIG. 4 shows a case where the decoded first coded data is coded in a frame structure, and a P3 picture is the current picture to be coded by the coding unit 104.

In FIG. 4, an I0 picture is the only picture that the P3 picture can refer to. Motion vectors MVF (P3) are motion vectors going from the P3 picture to the I0 picture. Such motion vectors each corresponding to a macroblock, that is, the motion vectors MVF (P3), are "time-scaled" into motion vectors which are to be obtained when is a frame immediately preceding the P3 picture is referred to. In other words, the motion vectors, to be obtained when a frame immediately preceding the P3 picture is referred to, are treated as motion vectors MVdec (P3), and the MVdec (P3) are expressed using the motion vectors MVF (P3) going from the P3 picture to the I0 picture. The relational expression is as follows:

$$MVdec(P3) = \frac{1}{3} \times MVF(P3)$$

The average of the vectors is calculated using the time-scaled motion vectors MVdec (P3).

$$AveMVdec(P3) = \Sigma MVdec(P3)/\text{number of vectors}$$

Here, the coefficient "⅓" in the expression of "MVdec (P3)=⅓×MVF (P3)" is referred to as a scaling coefficient.

The AveMVdec (P3) is an average vector, computed by the average vector computing unit 1051 shown in FIG. 3, of the motion vectors each of which corresponds to a macroblock and is obtained from the decoding information.

Under the MPEG-2 standard, even when pictures have a frame structure, it is possible to code the pictures while switching between frames and fields at a macroblock level. In such a case, motion vectors MVdec (P3) can be computed by changing the scaling coefficient in the temporal direction. To be more specific, in the case of field prediction, there are four combinations as follows, and the above mentioned scaling coefficient (⅓) is changed as follows:

(1) A top field refers to another top field. Scaling coefficient is ⅓.

(2) A top field refers to a bottom field. Scaling coefficient is ⅖.

(3) A bottom field refers to a top field. Scaling coefficient is 2/7.

(4) A bottom field refers to another bottom field. Scaling coefficient is ⅓.

It is to be noted that in the present Embodiment 1, pictures have a frame structure, and the first P picture is the current picture to be coded by the coding unit 104. However, the second picture, i.e. a B picture, or the third picture, i.e. the next B picture, may be the current picture to be coded by the coding unit 104. In such a case also, an average vector can be computed with the same approach.

Next, the following shall describe how an average vector is computed from coding information.

Figure 5:
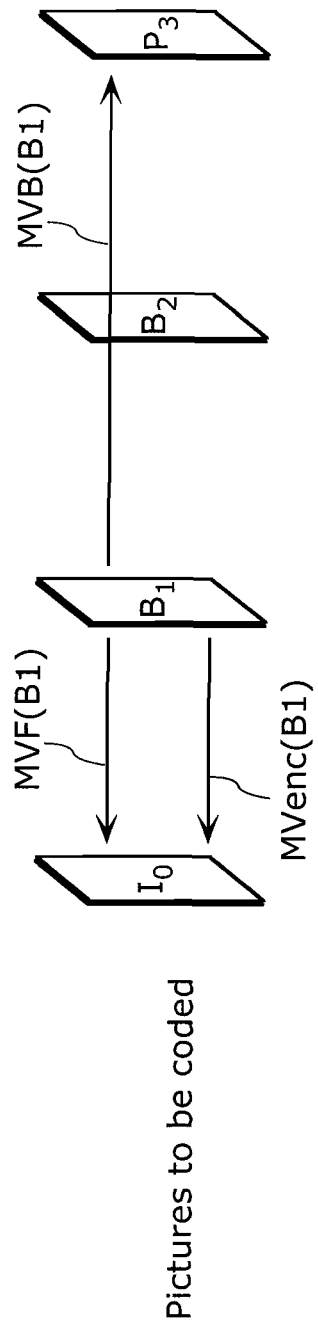
FIG. 5 is a diagram for describing how an average vector is computed from coding information according to Embodiment 1 of the present invention.

FIG. 5 is a diagram for describing how an average vector is computed from coding information. FIG. 5 shows a case where the coding unit 104 codes frame-structured pictures decoded by the decoding unit 102, and a B2 picture is the current picture to be coded by the coding unit 104. Under the H.264 standard, it is possible to refer to a P picture preceding an I picture. However, in order to simplify the description, the following shall describe a case where only an I picture and a P picture which are immediately preceding and immediately following the current picture are referred to, as in the MPEG-2 standard. When the current to-be-coded B2 picture is coded, a B1 picture is the picture coded immediately preceding the B2 picture according to the coding order.

In FIG. 5, there are two pictures that the B1 picture can refer to, namely, the I0 picture and the P3 picture. There are motion vectors MVF (B1) going from the B1 picture to the I0 picture, and motion vectors MVB (B1) going from the B1 picture to the P3 picture.

The MVF (B1) and MVB (B1), that is, the motion vectors of the B1 picture each corresponding to a macroblock, are time-scaled into motion vectors to be obtained when a frame immediately preceding the B1 picture is referred to. In other words, the motion vectors, to be obtained when the frame immediately preceding the B1 picture is referred to, are treated as MVenc (B1), and the MVenc (B1) are expressed using the motion vectors MVF (B1) going from the B1 picture to the I0 picture and using the motion vectors MVB (B1) going from the B1 picture to the P3 picture. The relational expression is as follows:

$$MVenc(B1) = MVF(B1)$$

$$MVenc(B1) = -\frac{1}{2} \times MVB(B1)$$

The average vector can be expressed as follows, using the time-scaled motion vectors MVenc (B1).

$$AveMVenc(B1) = \Sigma MVenc(B1)/\text{number of vectors}$$

It is assumed here to use motion vector information of the picture coded immediately preceding the current to-be-coded B2 picture (the B1 picture).

Further, AveMVenc (B1) is the average vector, computed by the average vector computing unit 1053 shown in FIG. 3, of motion vectors each of which corresponds to a macroblock and is obtained from the coding information.

When pictures are coded in the display order shown in FIG. 5, the coding order is I0, P3, B1, B2, P6, B4, B5 . . . . The example set forth above assumes that the B1 picture uses the motion vectors of the P3 picture.

It is to be noted that as a method alternative to that shown in the present Embodiment 1, it is possible to use motion vector information of a picture which is of the same picture type as the current picture and which has been coded immediately preceding the current picture.

One of the average vectors computed as described above, that is, either the AveMVdec (P3) or the AveMVenc (B1), is selected to be treated as MVsel, based on the coding condition indicating the picture type of the current picture to be coded by the coding unit 104. When the picture type of the current decoded picture to be coded by the coding unit 104 is P picture, the AveMVdec (P3) is selected to be treated as MVsel (P3), whereas when it is B picture, the AveMVenc (B1) is selected to be treated as MVsel (B2). The basic motion information generating unit 105 outputs the selected MVsel as basic motion information. More specifically, the picture-type determining unit 1057 determines the picture type of the current decoded picture to be coded by the coding unit 104, according to the coding condition provided by the coding unit 104 indicating a picture type. Either the average vector AveMVdec (P3) or the average vector AveMVenc (B1) is selected based on the selection criterion that one of the average vectors is selected according to the picture type of the current decoded picture to be coded by the coding unit 104. The average vector selected by the selector 1056, namely, either the average vector AveMVdec (P3) derived from the decoding information or the average vector AveMVenc (B1) derived from the coding information, is provided to the coding unit 104 as the basic motion information MVsel.

Figure 6:
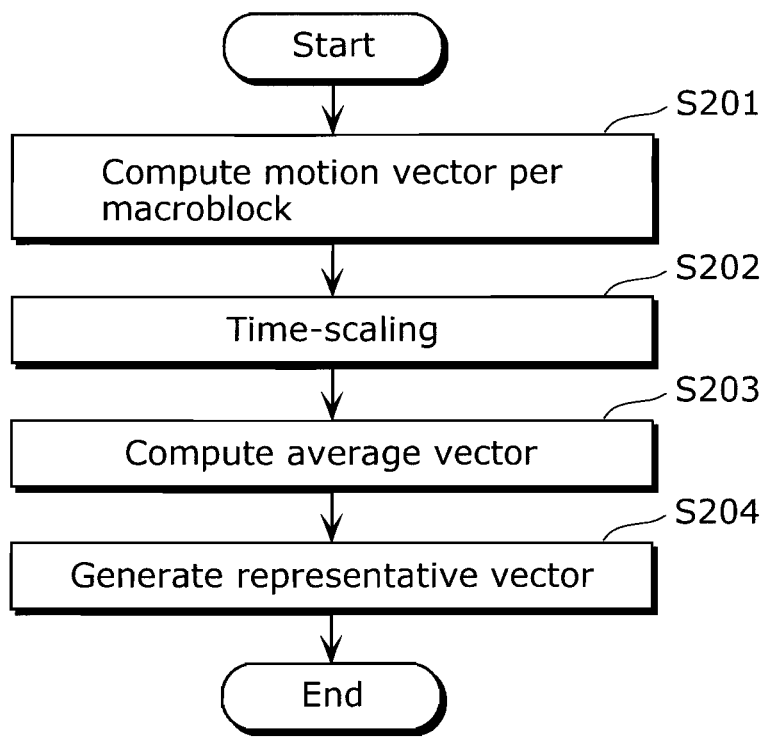
FIG. 6 is a flow chart for describing a process performed by a basic motion information generating unit 105 according to Embodiment 1 of the present invention for generating a representative vector.

FIG. 6 is a flow chart for describing a process performed by the basic motion information generating unit 105 for generating a representative vector.

Here, the following shall describe a case where the average vector computing unit 1051 generates a representative vector.

At first, the average vector computing unit 1051 computes motion vectors each corresponding to a macroblock, from the decoding information provided by the decoding information holding unit 103 (S201).

Next, the average vector computing unit 1051 time-scales the current to-be-coded picture's motion vectors, each corresponding to a macroblock, into motion vectors each of which corresponds to a macroblock and is to be obtained when the current picture refers to a predetermined reference picture (S202).

Next, the average vector computing unit 1051 computes the average vector of the current to-be-coded picture's motion vectors, using the time-scaled motion vectors (S203).

Next, the average vector computing unit 1051 generates a representative vector by treating the computed average vector as a representative vector derived from the decoding information (S204).

It is to be noted that the average vector computing unit 1053 generates a representative vector in the same manner and thus the description thereof shall be omitted.

Next, the following shall describe how the coding unit 104 determines a search range.

Figure 7:
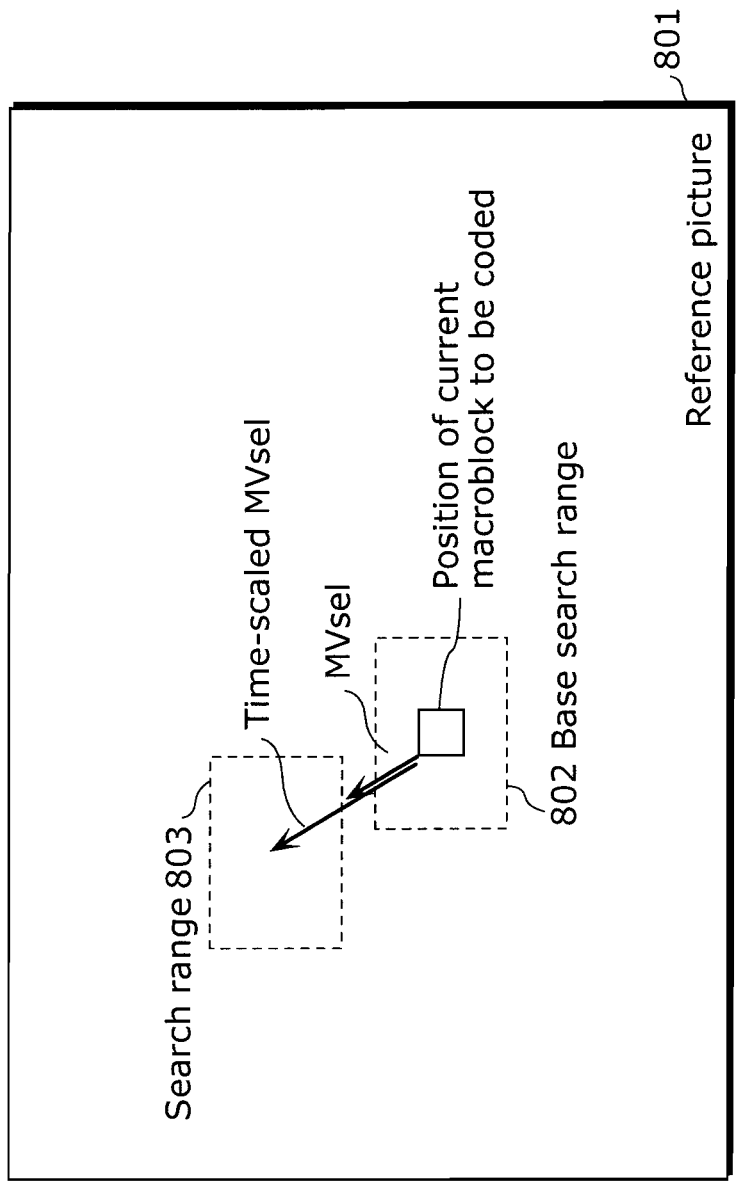
FIG. 7 is a diagram for describing how a search range is determined using basic motion information according to Embodiment 1 of the present invention.

FIG. 7 is a diagram for describing how a search range is determined using basic motion information.

Using MVsel, that is, the basic motion information provided by the basic motion information generating unit 105, the coding unit 104 time-scales the current picture to be coded into a reference picture, and determines the center of a search range for each reference picture. The search range, serving as a base for motion vector estimation performed for each macroblock of the current picture to be coded, is a base search range 802 in a reference picture 801 in FIG. 7, surrounded by a dotted line. The motion vector estimation is performed with a new search range, i.e. the base search range 802 shifted by MVsel through the time-scaling from the current picture to be coded into the reference picture 801. The new search range is shown as a search range 803 surrounded by a dotted line in FIG. 7.

In the present Embodiment 1, the area of the search range, in which the motion vector estimation is carried out, is constant, and the only change made is in the center position. It is to be noted, however, that the search range for the motion vector estimation may be enlarged when the time-scaled basic motion information MVsel has a large value, to perform further thinned-out search, for example.

As set forth above, the present Embodiment 1 has described the case where the basic motion information generating unit 105 outputs a single vector as the basic motion information. The basic motion information is a representative vector selected by the selector 1056, namely, either the representative vector computed from the decoding information by the average vector computing unit 1051 or the representative vector computed from the coding information by the average vector computing unit 1053. Further, the picture type of the current decoded picture to be coded by the coding unit 104 serves as the criterion for selecting either the representative vector (average vector) computed from the decoding information by the average vector computing unit 1051 or the representative vector (average vector) computed from the coding information by the average vector computing unit 1053.

As a result, when estimating motion vectors, one of the representative vectors is selected according to the picture type of the current decoded picture to be coded by the coding unit 104, i.e. either the representative vector computed from the decoding information of an input stream or the representative vector computed from the coding information which was used for coding the previous picture. Then the selected representative vector is used as the basic motion information for determining the search range for motion vector estimation. As a result, motion vectors can be efficiently estimated. In other words, it is possible to estimate highly accurate motion vectors even when the search range for motion vector estimation is narrowed to reduce the processing amount. As a result, it is possible to provide an image coding apparatus capable of coding images by estimating highly accurate motion vectors while reducing the processing amount.

In the present Embodiment 1, as the representative vector derived from the decoding information and as the representative vector derived from the coding information, the average of all the time-scaled motion vectors, each corresponding to a macroblock, is computed. It is to be noted, however, that average vectors and vector variance of time-scaled motion vectors each of which corresponds to a macroblock may be computed for each reference picture to select an average vector of a reference picture having a smaller variance value. Alternatively, an average vector representing a greater number of motion vectors may be selected.

Embodiment 2

Hereinafter, Embodiment 2 of the present invention shall be described with reference to the drawings.

Embodiment 1 has shown the case where the basic motion information generating unit 105 outputs a single vector as basic motion information, and where the first coded data and the second coded data both have a frame structure. The present Embodiment 2 shall still describe the case where the basic motion information generating unit 105 outputs a single vector as basic motion information, but the first coded data and the second coded data both have a field structure.

Figure 8:
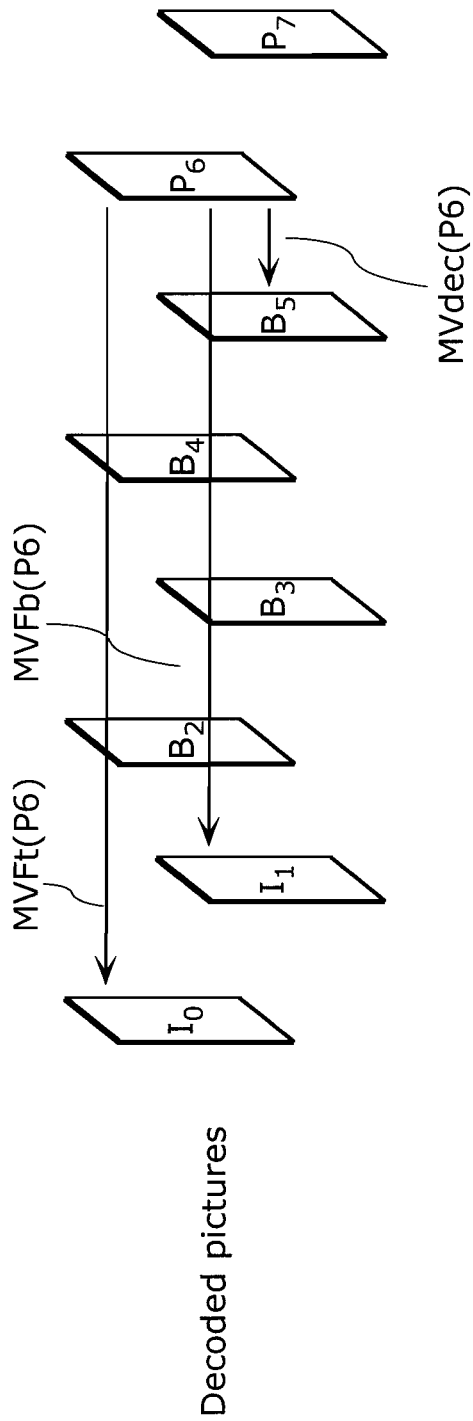
FIG. 8 is a diagram for describing how an average vector is computed from decoding information according to Embodiment 2 of the present invention.

FIG. 8 is a diagram for describing how an average vector is computed from decoding information. FIG. 8 shows a case where the decoded first coded data is coded in a field structure, and a P6 field is the current picture to be coded by the coding unit 104.

As FIG. 8 shows, the P6 field can refer to two fields, namely, an I0 field and an I1 field. More specifically, the motion vectors going from the P6 field to the I0 field, which is the top field, are MVFt (P6), and the motion vectors going from the P6 field to the I1 field, which is the bottom field, are MVFb (P6). Such motion vectors each of which corresponds to a macroblock are time-scaled into motion vectors which are to be obtained when the P6 field refers to an immediately preceding field. The relational expression of MVdec (P6), which are the motion vectors to be obtained when the P6 field refers to the immediately preceding field, is as follows.

$$MVdec(P6)=\frac{1}{6}\times MVFt(P6)$$

$$MVdec(P6)=\frac{1}{5}\times MVFb(P6)$$

The average of the vectors can be expressed as follows using the time-scaled motion vectors MVdec (P6), as in the case of the frame structure shown in Embodiment 1.

$$AveMVdec(P6)=\Sigma MVdec(P6)/\text{number of vectors}$$

Figure 9:
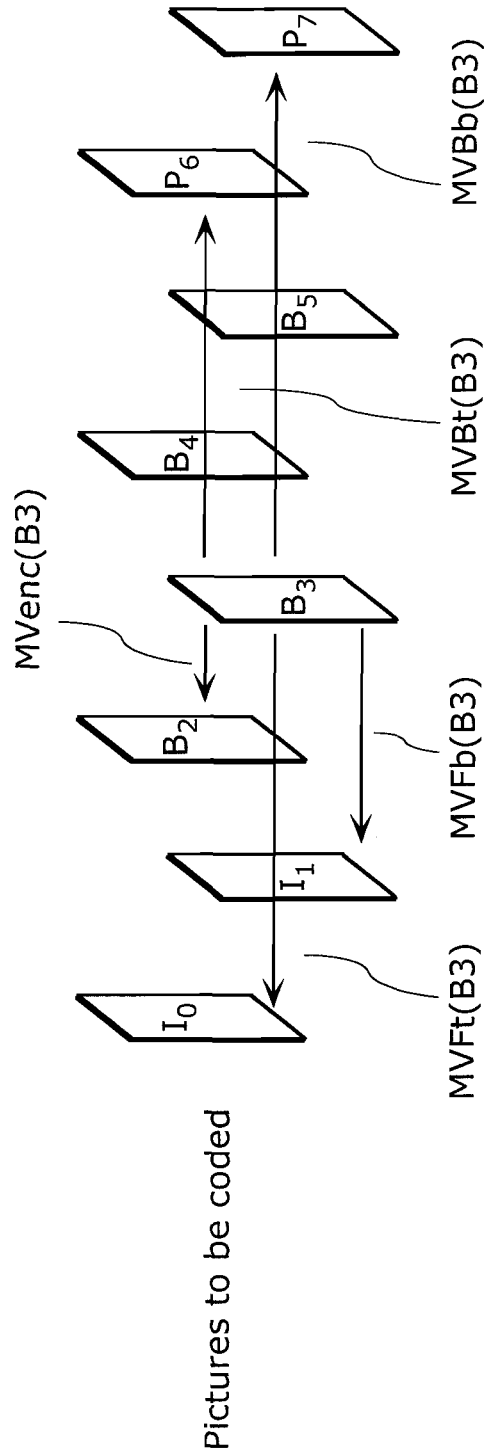
FIG. 9 is a diagram for describing how an average vector is computed from coding information according to Embodiment 2 of the present invention.

FIG. 9 is a diagram for describing how an average vector is computed from coding information. FIG. 9 shows a case where the coding unit 104 codes field-structured pictures decoded by the decoding unit 102, and where a B4 field is the current picture to be coded by the coding unit 104. Under the H.264 standard, it is possible to refer to a P picture preceding an I picture. However, in order to simplify the description, the following shall describe a case where only an I picture and a P picture that are immediately preceding and immediately following the current picture are referred to, as in the MPEG-2 standard. When the current to-be-coded B4 field is coded, it is the B3 field that was coded immediately preceding the B4 field according to the coding order.

As FIG. 9 shows, the B3 field can refer to two fields in the case of referring to preceding pictures, namely, an I0 field and an I1 field. More specifically, the motion vectors going from the B3 field to the I0 field are MVFt (B3), and the motion vectors going from the B3 field to the I1 field are MVFb (B3). The B3 field can refer to two fields in the case of referring to following pictures, namely, a P6 field and a P7 field. More specifically, the motion vectors going from the B3 field to the P6 field are MVBt (B3) and the motion vectors going from the B3 field to the P7 field are MVBb (B3). Such motion vectors, each of which corresponds to a macroblock, are time-scaled into motion vectors which are to be obtained when the B3 field refers to an immediately preceding field. The relational expression of MVenc (B3), the motion vectors to be obtained when the B4 field refers to the immediately preceding field, is as follows.

$$MVenc(B3)=\frac{1}{3}\times MVFt(B3)$$

$$MVenc(B3)=\frac{1}{2}\times MVFb(B3)$$

$$MVenc(B3)=-\frac{1}{3}\times MVBt(B3)$$

$$MVenc(B3)=-\frac{1}{4}\times MVBb(B3)$$

The average of the vectors can be expressed as follows using the time-scaled motion vectors MVenc (B3).

$$AveMVenc(B3)=\Sigma MVenc(B3)/\text{number of vectors}$$

It is assumed here to use the motion vector information of the picture coded immediately preceding the current to-be-coded B4 field.

When the pictures are coded in the display order shown in FIG. 9, the coding order is I0, I1, P6, P7, B2, B3, B4, B5, P12, P13 . . . . In the example set forth above, it is assumed that the B2 field uses the motion vectors of the P7 field.

It is to be noted that as a method alternative to that shown in the present Embodiment 2, it is possible to use the motion vector information of a picture which is of the same picture type as the current picture and has been coded immediately preceding the current picture. Another method may be to use the motion vector information of a picture which is of the same picture type and of the same parity as the current picture and has been coded immediately preceding the current picture.

One of the average vectors computed as described above, that is, either the AveMVdec (P3) or the AveMVenc (B1), is selected to be treated as MVsel, based on a coding condition indicating the picture type of the current picture to be coded by the coding unit 104. When the picture type of the current decoded picture to be coded by the coding unit 104 is P picture, the AveMVdec (P3) is selected to be treated as MVsel (P3), whereas when it is B picture, the AveMVenc (B1) is selected to be treated as MVsel (B2). The basic motion information generating unit 105 outputs the selected MVsel as basic motion information.

Next, the following shall describe how the coding unit 104 determines a search range.

As described above, the basic motion information generating unit 105 selects either a representative vector (average vector) computed from the decoding information or a representative vector (average vector) computed from the coding information, according to the picture type of a current decoded picture to be coded by the coding unit 104, and provides the selected representative vector to the coding unit 104 as basic motion information MVsel.

Using the basic motion information MVsel provided by the basic motion information generating unit 105, the coding unit 104 time-scales the current picture to be coded into a reference picture, and determines the center of a search range for each reference picture.

In the present Embodiment 2, the area of the search range is constant, and the only change made is in the center position. It is to be noted, however, that the search range may be enlarged when the time-scaled basic motion information MVsel has a large value, for further thinned-out search, for example.

As described, the present Embodiment 2 has shown that even when a current decoded picture to be coded has the field structure, a representative vector is selected for estimating motion vectors according to the picture type of the current decoded picture to be coded, that is, either a representative vector computed from the decoding information of an input stream or a representative vector computed from the coding information used when the previous picture was coded. Determining a search range for motion vector estimation using the selected representative vector (either the representative vector derived from the decoding information or the representative vector derived from the coding information) as basic motion information enables effective motion vector estimation. In other words, it is possible to estimate highly accurate motion vectors even when the search range for motion vector estimation is narrowed to reduce the processing amount. As a result, it is possible to provide an image coding apparatus capable of coding images by estimating highly accurate motion vectors while reducing the processing amount.

In the present Embodiment 2, the average of all the time-scaled motion vectors of the respective macroblocks is computed as a representative vector derived from the decoding information and also computed as a representative vector derived from the coding information. It is to be noted, however, that average vectors and vector variance of time-scaled motion vectors each of which corresponds to a macroblock may be computed for each reference picture to select an average vector of a reference picture having a smaller variance value. Alternatively, an average vector representing a greater number of motion vectors may be selected.

Embodiment 3

The following shall describe Embodiment 3 of the present invention.

Embodiment 2 has shown the case where the basic motion information generating unit 105 outputs a single vector as basic motion information, and where the first coded data and the second coded data both have a field structure. The present Embodiment 3 shall still describe the case where the basic motion information generating unit 105 outputs a single vector as basic motion information, but the first coded data has a different coding structure from that of the second coded data.

When the first coded data has a frame structure whereas the second coded data has a field structure, the representative vector derived from the decoding information can be obtained by computing an average vector by the method shown in Embodiment 1, and the representative vector derived from the coding information can be obtained by computing an average vector by the method shown in Embodiment 2. To be more specific, the representative vector derived from the decoding information is equivalent to the motion vector of the current picture to be coded which is obtained when a frame immediately preceding the current picture is referred to and is the average vector of the current picture computed through time-scaling. Multiplying this average vector by ½ derives the motion vector of the current field to be coded which is the motion vector to be obtained when a field immediately preceding the current field is referred to.

Further, when the first coded data has a field structure whereas the second coded data has a frame structure, the representative vector derived from the decoding information can be obtained by computing an average vector by the method shown in Embodiment 2, and the representative vector derived from the coding information can be obtained by computing an average vector by the method shown in Embodiment 1. To be more specific, the representative vector derived from the decoding information is equivalent to the motion vector of the current field to be coded which is the motion vector to be obtained when a field immediately preceding the current field is referred to and is the average vector of the current field computed through time-scaling. Multiplying this average vector by 2 derives the motion vector of the current picture to be coded which is the motion vector to be obtained when a frame immediately preceding the current picture is referred to.

Furthermore, as in Embodiments 1 and 2, a representative vector is selected according to the picture type of the current picture to be coded, indicated by a coding condition provided by the coding unit 104. More specifically, the representative vector computed from the decoding information is selected in the case of determining P picture as the picture type of the current decoded picture to be coded by the coding unit 104; and the representative vector computed from the coding information is selected in the case of determining B picture as the picture type of the current decoded picture to be coded.

As described above, the present Embodiment 3 has shown that even when the first coded data has a field structure and the second coded data has a frame structure or vice versa, a representative vector is selected for estimating motion vectors according to the picture type of the current decoded picture to be coded by the coding unit 104, that is, either a representative vector computed from the decoding information of an input stream or a representative vector computed from the coding information used when the previous picture was coded. Determining a search range for motion vector estimation using the selected representative vector (either the representative vector derived from the decoding information or the representative vector derived from the coding information) as basic motion information enables effective motion vector estimation. In other words, it is possible to estimate highly accurate motion vectors even when the search range for motion vector estimation is narrowed to reduce the processing amount. As a result, it is possible to provide an image coding apparatus capable of coding images by estimating highly accurate motion vectors while reducing the processing amount.

Embodiment 4

The following shall describe Embodiment 4 of the present invention.

Embodiment 3 has shown the case where the basic motion information generating unit 105 outputs a single vector as basic motion information, and where the first coded data has a different coding structure from that of the second coded data. Embodiment 4 shall show a case where the basic motion information generating unit 105 outputs a representative vector for each reference direction as basic motion information. The case here is that the first coded data and the second coded data both have a frame structure as their coding structure.

The representative vector derived from the decoding information and the representative vector derived from the coding information can be computed by the method shown in Embodiment 1.

As in S201 of FIG. 6, the average vector computing unit 1051 of the basic motion information generating unit 105 computes motion vectors, each corresponding to a macroblock, from decoding information. Similarly, the average vector computing unit 1053 of the basic motion information generating unit 105 computes motion vectors, each corresponding to a macroblock, from coding information.

Next, each of the average vector computing units 1051 and 1053 of the basic motion information generating unit 105 performs an operation on the above computed motion vectors for each reference direction to perform time-scaling.

Next, as in S202 of FIG. 6, each of the average vector computing units 1051 and 1053 of the basic motion information generating unit 105 time-scales the motion vectors, on which the above operation has been performed for each reference direction, into motion vectors of each reference direction which are to be obtained when the current picture refers to each of predetermined reference pictures.

Next, as in S202 of FIG. 6, each of the average vector computing units 1051 and 1053 of the basic motion information generating unit 105 computes, for each reference direction, an average vector of the current picture to be coded, using the motion vectors time-scaled for each reference direction.

The basic motion information generating unit 105 selects, for each reference direction, either the representative vector (average vector) computed from the decoding information or the representative vector (average vector) computed from the coding information, according to the picture type of the current decoded picture to be coded by the coding unit 104. Then, the basic motion information generating unit 105 provides the representative vectors selected for respective reference directions to the coding unit 104 as basic motion information.

As described, the present Embodiment 4 has shown that for each reference direction, a representative vector is selected for motion vector estimation according to the picture type of the current decoded picture to be coded by the coding unit 104, that is, either a representative vector computed from the decoding information of an input stream or a representative vector computed from the coding information used when the previous picture was coded. Determining search ranges for motion vector estimation using the representative vectors selected for respective reference directions (each representative vector is either the representative vector computed from the decoding information or the representative vector computed from the coding information) as basic motion information enables effective motion vector estimation. In other words, it is possible to estimate highly accurate motion vectors even when the search range for motion vector estimation is narrowed to reduce the processing amount. As a result, it is possible to provide an image coding apparatus capable of coding images by estimating highly accurate motion vectors while reducing the processing amount.

The present Embodiment 4 has shown the case of computing, for each reference direction, an average vector of motion vectors derived from the decoding information and an average vector of motion vectors derived from coding information. It is to be noted, however, that the average vectors may be computed for each reference picture. Furthermore, when some reference pictures in a reference direction have a greater number of motion vectors than others in the reference direction, the average vector of the reference picture having the greatest number of vectors may be treated as the representative of the reference direction.

Moreover, even when the first coded data and the second coded data both have a field structure as their coding structure, a representative vector derived from the decoding information and a representative vector derived from the coding information may be computed for each reference direction by the method shown in Embodiment 2.

Furthermore, when the first coded data has a different coding structure from that of the second coded data, a representative vector derived from the decoding information and a representative vector derived from the coding information may be computed for each reference direction by the method shown in Embodiment 3.

Embodiment 5

The following shall describe Embodiment 5 of the present invention.

Embodiment 4 has shown the case where the basic motion information generating unit 105 outputs a representative vector for each reference direction as basic motion information. In the present Embodiment 5, the basic motion information generating unit 105 divides each picture into a plurality of areas, and computes a representative vector for each of the areas, and then outputs the computed representative vectors as basic motion information. The basic motion information generating unit 105 outputs a plurality of vectors.

The case here is that the first coded data and the second coded data both have a frame structure as their coding structure.

Further, the exemplary case described here is that each picture is divided into four areas horizontally, and four areas vertically (hereinafter the picture is referred to as divided frame).

Figure 10:
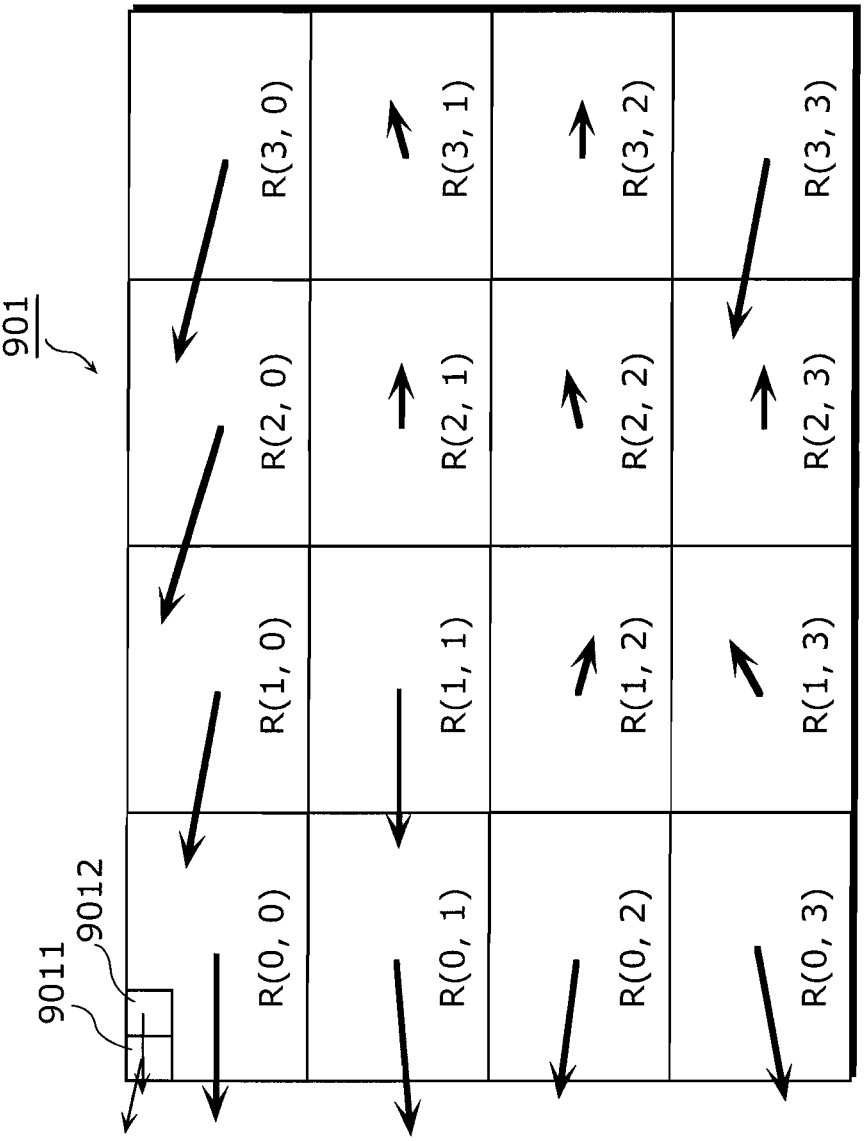
FIG. 10 is a diagram for describing representative vectors each of which corresponds to one of areas of a divided frame 901 according to Embodiment 5 of the present invention.

FIG. 10 is a diagram for describing the case where a representative vector is computed for each area of a divided frame 901. Small rectangular areas shown at the top left of FIG. 10 represent macroblocks which are called a macroblock 9011 and a macroblock 9012 as examples.

Arrows shown at the macroblock 9011 and the macroblock 9012 of FIG. 10 represent motion vectors of the respective macroblocks of the current picture to be coded by the coding unit 104, in the case where the motion vectors of the current picture to be coded have been time-scaled into motion vectors which are to be obtained when a picture immediately preceding the current picture is referred to.

Further, each area shown in FIG. 10 with R (x, y) (where x and y are both an integer between 0 and 3 inclusive) represents an area of the divided frame 901. An operation is performed on the motion vectors of each of the areas, each motion vector corresponding to a macroblock. Then an average vector is computed for each area. Sixteen representative vectors, each corresponding to one of the areas, are computed from decoding information, and another sixteen representative vectors are computed from coding information. A representative vector is selected for each area from among either the representative vectors derived from the decoding information or the representative vectors derived from the coding information, according to the picture type of the current decoded picture to be coded by the coding unit 104. Then, the sixteen representative vectors, each selected for one of the areas, are outputted as basic motion information generated by the basic motion information generating unit 105.

Figure 11:
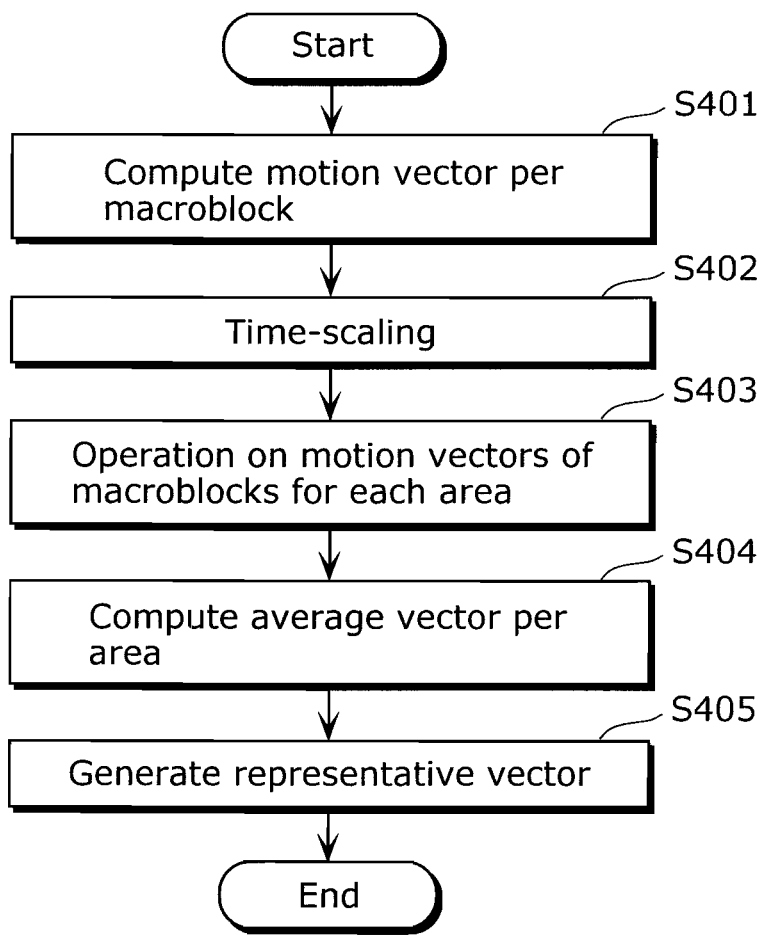
FIG. 11 is a flow chart for describing a process performed by a basic motion information generating unit 105 according to Embodiment 5 of the present invention for generating a representative vector for each area of the divided frame 901.

FIG. 11 is a flow chart for describing a process performed by the basic motion information generating unit 105 for generating a representative vector for each area of the divided frame 901.

Here, the following shall describe a case where the average vector computing unit 1051 generates a representative vector for each area of the divided frame 901.

At first, the average vector computing unit 1051 computes motion vectors each corresponding to a macroblock, from the decoding information provided by the decoding information holding unit 103 (S401).

Next, the average vector computing unit 1051 time-scales the current to-be-coded picture's motion vectors, each corresponding to a macroblock, into motion vectors each of which corresponds to a macroblock and is to be obtained when the current picture refers to a predetermined reference picture (S402).

Next, for each area of the divided frame 901, the average vector computing unit 1051 performs an operation on the current to-be-coded picture's motion vectors each of which corresponds to a macroblock and has been time-scaled (S403).

Next, the average vector computing unit 1051 computes an average vector for each area of the divided frame 901, using the current to-be-coded picture's motion vectors which have been time-scaled and on which the above operation has been performed on an area-by-area basis (S404).

Next, the average vector computing unit 1051 generates a representative vector for each area by treating the average vector computed for a corresponding area as a representative vector, derived from the decoding information, of the corresponding area (S404).

It is to be noted that the average vector computing unit 1053 generates a representative vector for each area in the same manner, and thus the description thereof shall be omitted.

Furthermore, as in Embodiments 1 through 4, a representative vector is selected according to the picture type of the current picture to be coded, indicated by a coding condition provided by the coding unit 104. More specifically, the basic motion information generating unit 105 selects the representative vectors each computed from the decoding information for one of the areas, in the case of determining P picture as the picture type of the current decoded picture to be coded by the coding unit 104; and selects the representative vectors each computed from the coding information for one of the areas, in the case of determining B picture as the picture type of the current decoded picture to be coded.

Next, the following shall describe how the coding unit 104 determines a search range.

The coding unit 104 changes a search range for motion vector estimation, depending on which of the sixteen areas of the divided frame 901 a current macroblock to be coded is in. For example, when assuming a macroblock in an area R (0, 0) is the current macroblock to be coded, motion vectors are estimated in the search range having its center positioned where the representative vector of the area R (0, 0) points at.

In this case, the center of the search range can be changed by changing the basic motion information MVsel for each area having a current macroblock to be coded, instead of by changing the basic motion information MVsel for each reference picture, as described with reference to FIG. 7.

As described above, in the present Embodiment 5, the basic motion information generating unit 105 generates, as the basic motion information, a representative vector for each of the areas according to the picture type of the current decoded picture to be coded by the coding unit 104. When estimating motion vectors, a representative vector is selected for each area according to the picture type of the current decoded picture to be coded by the coding unit 104, that is, either a representative vector derived from the decoding information of an input stream or a representative vector derived from the coding information used when the previous picture was coded. Determining a search range for motion vector estimation using the selected representative vector (either the representative vector derived from the decoding information or the representative vector derived from the coding information) as the basic motion information enables effective motion vector estimation. In other words, it is possible to estimate highly accurate motion vectors even when the search range for motion vector estimation is narrowed to reduce the processing amount. As a result, it is possible to provide an image coding apparatus capable of coding images by estimating highly accurate motion vectors while reducing the processing amount.

The present embodiment has shown the case where the first coded data and the second coded data both have a frame structure as their coding structure. It is to be noted, however, that even in a case where the first coded data and the second coded data both have a field structure, or in a case where one has a frame structure and the other has a field structure, the method for computing a representative vector described in Embodiment 2 or 3 may be applied to the area-by-area based representative vector computation.

Furthermore, the present embodiment has shown the case where the basic motion information generating unit 105 generates, as basic motion information, a single representative vector for each area of the current picture to be coded. However, as described in Embodiment 4, a representative vector corresponding to one of the areas may be computed as basic motion information for each reference direction of the current picture to be coded.

In addition, the basic motion information generating unit 105 may group representative vectors, each corresponding to one of the areas of the current picture to be coded, by magnitude and direction, to generate one or more representative vectors as the basic motion information. For example, the vectors of the respective areas of the divided frame 901 in FIG. 10 may be classified into groups as follows: the representative vector of the area R (0, 0) may be classified into a group of left-pointing vectors with greater magnitudes; and the representative vector of the area R (2,1) may be classified into a group of right-pointing vectors with smaller magnitudes. The basic motion information generating unit 105 computes an average vector for each group, and treats a single representative vector as the basic motion information for each group. The basic motion information generating unit 105 may compute a median value, a maximum value or a minimum value of the motion vectors of each group instead of an average vector.

Embodiment 6

The following shall describe Embodiment 6 of the present invention.

Embodiment 5 has shown the case where a representative vector is computed for each of areas into which a frame is divided, as a method for the basic motion information generating unit 105 to perform an operation on motion vectors of respective macroblocks. The present Embodiment 6 shall describe a method of classifying motion vectors of respective macroblocks into groups by magnitude and direction, as a method for the basic motion information generating unit 105 to perform an operation on motion vectors of the respective macroblocks.

Figure 12:
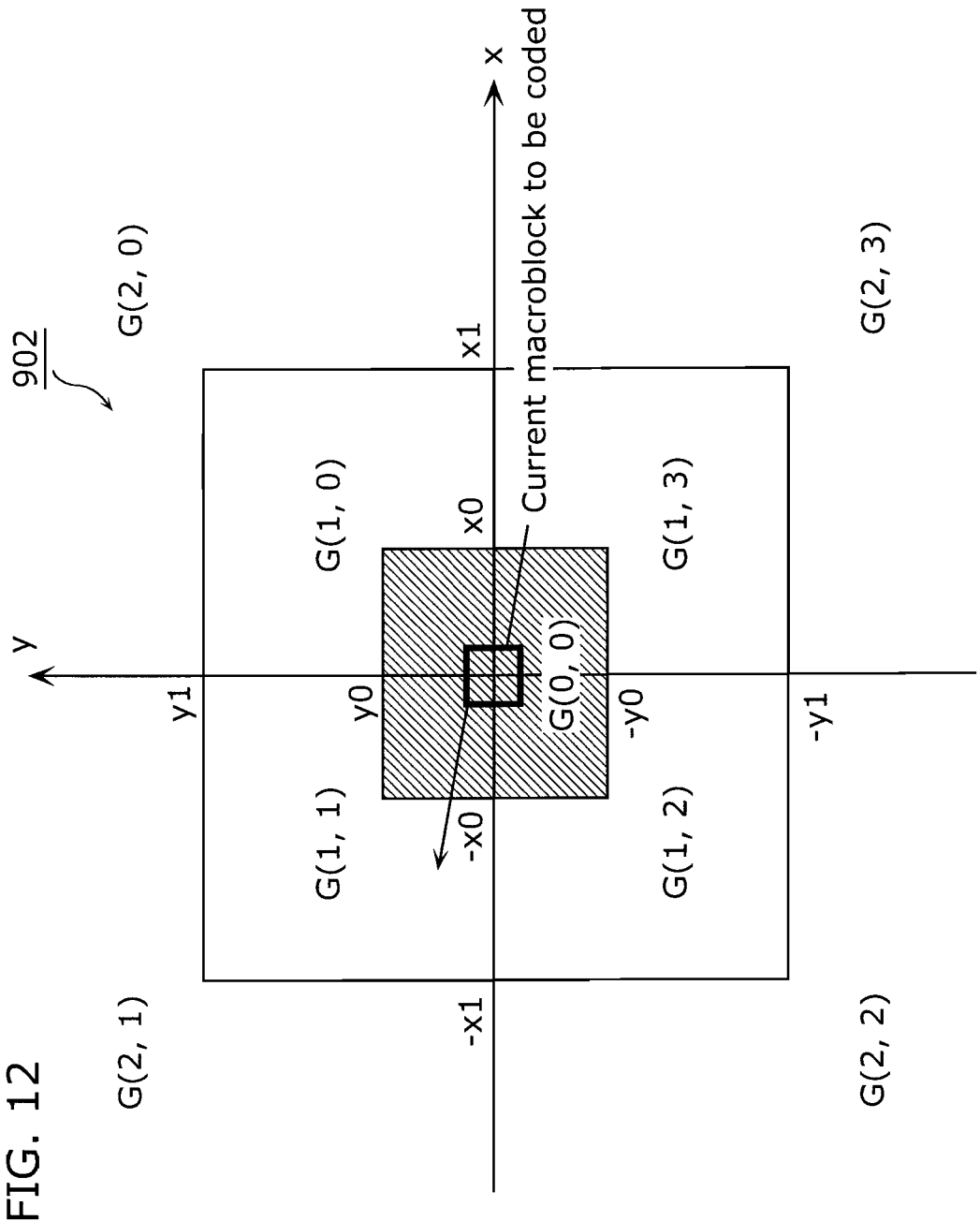
FIG. 12 is a diagram for describing a case of computing representative vectors, each corresponding to one of sub-areas into which an area is divided according to magnitude and direction of motion vectors according to Embodiment 6 of the present invention.

FIG. 12 is a diagram for describing a case of computing representative vectors, each corresponding to one of sub-areas into which an area 902 is divided according to magnitude and direction of motion vectors.

The basic motion information generating unit 105 time-scales motion vectors, each of which corresponds to a macroblock and can be derived from either decoding information or coding information. Then, the basic motion information generating unit 105 examines the time-scaled motion vectors to see which of the sub-areas, into which the area 902 is divided according to magnitude and direction of motion vectors as shown in FIG. 12, each of the motion vectors is included in.

It is assumed here that a group consisting of motion vectors having magnitudes close to zero is in a sub-area indicated by G (0, 0). Further, a group positioned near the sub-area indicated by G (0, 0) and consisting of motion vectors having relatively small magnitudes is assumed to be in one of sub-areas G (1, 0) to G (1, 3) which are respectively in the first to fourth quadrants. Furthermore, a group consisting of motion vectors having greater magnitudes is assumed to be in one of sub-areas G (2, 0) to G (2, 3) which are respectively in the first to fourth quadrants. For example, any numbers can be given to x0, x1, y0, and y1, each being a boundary value of the sub-area G (1, 0) in the first quadrant of the area 902. For example, they may be that x0=y0=16, and x1=y1=48. FIG. 12 shows that the motion vector of the current macroblock to be coded is in the sub-area G (1, 1).

For each group of motion vectors classified by magnitude and direction, the basic motion information generating unit 105 performs an operation on the motion vectors which have been time-scaled on a macroblock-by-macroblock basis and computed from either decoding information or coding information. Then, the basic motion information generating unit 105 computes, for each group of motion vectors, an average vector from the motion vectors which have been derived from the decoding information and on which the above operation has been performed on a group-by-group basis, and an average vector from the motion vectors which have been derived from the coding information and on which the above operation has been performed on a group-by-group basis. Then, for each group of motion vectors, the basic motion information generating unit 105 selects either the average vector computed from the decoding information or the average vector computed from the coding information, as a representative vector. Then the basic motion information generating unit 105 provides nine representative vectors generated by selecting an average vector for each of nine groups of motion vectors classified by magnitude and direction, to the coding unit 104 as basic motion information.

Figure 13:
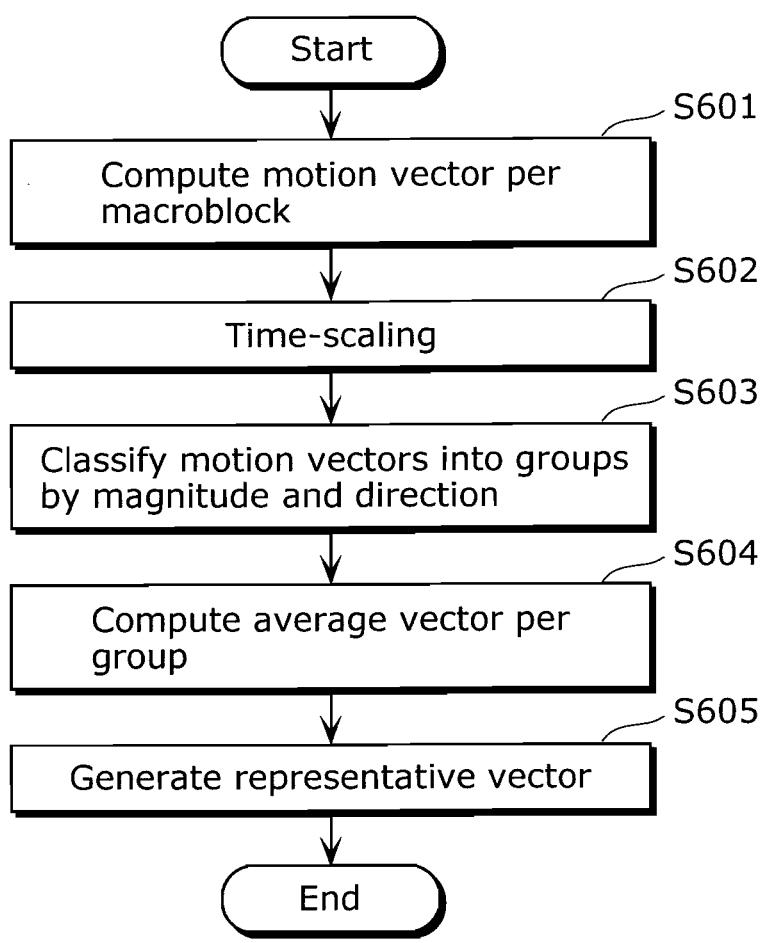
FIG. 13 is a flow chart for describing a process performed by a basic motion information generating unit according to Embodiment 6 of the present invention for generating a representative vector for each of sub-areas, into which an area is divided according to magnitude and direction of motion vectors.

FIG. 13 is a flow chart for describing a process performed by the basic motion information generating unit 105 for generating a representative vector for each of the sub-areas, into which the area 902 is divided according to magnitude and direction of motion vectors.

The following shall describe a case where the average vector computing unit 1051 generates a representative vector for each of the sub-areas.

At first, the average vector computing unit 1051 computes motion vectors, each of which corresponds to a macroblock, from the decoding information provided by the decoding information holding unit 103 (S601).

Next, the average vector computing unit 1051 time-scales the current to-be-coded picture's motion vectors, each corresponding to a macroblock, into motion vectors each of which corresponds to a macroblock and is to be obtained when the current picture refers to a predetermined reference picture (S602).

Next, the average vector computing unit 1051 computes an average vector of the current to-be-coded picture's motion vectors, each of which corresponds to a macroblock, using the time-scaled current to-be-coded picture's motion vectors.

Next, for each of the sub-areas, the average vector computing unit 1051 performs an operation on the time-scaled motion vectors, each corresponding to a macroblock (S603).

Next, the average vector computing unit 1051 computes an average vector for each of the sub-areas, using the current to-be-coded picture's motion vectors which have been time-scaled and on which an operation has been performed on a sub-area-by-sub-area basis (S604).

Next, the average vector computing unit 1051 generates a representative vector for each sub-area by treating, for each sub-area, the computed average vector as a representative vector of the sub-area, derived from the decoding information (S605).

It is to be noted that the average vector computing unit 1053 generates a representative vector for each sub-area in the same manner, and thus the description thereof shall be omitted.

Furthermore, as in Embodiments 1 through 5, a representative vector is selected according to the picture type of the current picture to be coded, indicated by a coding condition provided by the coding unit 104. More specifically, the basic motion information generating unit 105 selects, for each of sub-areas into which the area 902 is divided according to magnitude and direction of motion vectors, a representative vector computed from the decoding information, in the case of determining P picture as the picture type of the current decoded picture to be coded by the coding unit 104; and selects, for each of the sub-areas, a representative vector computed from the coding information, in the case of determining B picture as the picture type of the current decoded picture to be coded.

Next, the following shall describe how the coding unit 104 determines a search range.

The coding unit 104 performs motion vector estimation by searching nine search ranges per reference picture based on the nine representative vectors of the respective sub-areas into which the area 902 is divided. Alternately, the coding unit 104 performs motion vector estimation by, for example, searching a total of nine search ranges selected per reference picture.

The present Embodiment 6 is based on the assumption that the basic motion information generating unit 105 classifies motion vectors into groups and outputs all of the computed representative vectors as basic motion information. It is to be noted, however, that only the average vector of the group having the greatest number of motion vectors may be computed as the representative vector, for example. Further, the average vectors of the groups having the greatest and the second greatest numbers of motion vectors may be computed as representative vectors.

In addition, the basic motion information generating unit 105 may perform the operation on the motion vectors for each of sub-areas into which the area 902 is divided according to reference direction and motion vectors' magnitude and direction. In such a case, the area 902 is divided into 18 sub-areas, and thus 18 average vectors are provided to the coding unit 104 as representative vectors. Furthermore, the basic motion information generating unit 105 may provide the coding unit 104 only with the average vector, as the basic motion information, of the group having the greatest number of motion vectors among all the motion vector groups in the area 902, or provide the coding unit 104 with the representative vectors, as the basic motion information, of the groups having the greatest and the second greatest numbers of motion vectors among all the motion vector groups in the area 902.

Moreover, the present Embodiment 6 has shown the case of dividing the area 902 into nine sub-areas according to magnitude and direction of motion vectors, but the present invention is not limited to this. For example, the area 902 may be separated according to four directions spaced 90° apart from one direction to the next, starting from the x axis, and be separated according to eight directions spaced 45° apart from one direction to the next, starting from the position forming 22.5° with the x axis. In such a case, the area 902 is divided into 17 sub-areas, assuming the same approach for classifying motion vectors by magnitude and direction as shown in FIG. 12.

Furthermore, the present Embodiment 6 has shown that the basic motion information generating unit 105 classifies motion vectors of respective macroblocks into groups and computes an average vector for every group to generate a representative vector for every group, but the present invention is not limited to this. The basic motion information generating unit 105 may classify the motion vectors into groups after computing an average vector for each area. To be more specific, the basic motion information generating unit 105 may compute, for each area of the divided frame 901 for example, an average vector of motion vectors which have been computed from the decoding information and been time-scaled for each macroblock, and an average vector of motion vectors which have been computed from the coding information and been time-scaled for each macroblock; and generate representative vectors after classifying the computed average vectors into groups by their magnitudes and directions. In such a case, the basic motion information generating unit 105 provides nine representative vectors, generated by selecting an average vector from each of nine groups of the average vectors classified by their magnitude and direction, to the coding unit 104 as basic motion information. Furthermore, the basic motion information generating unit 105 may select a group having the greatest number of average vectors among the nine groups to provide the average vector of the selected group's motion vectors to the coding unit 104 as basic motion information.

As described above, the present Embodiment 6 has shown that the basic motion information generating unit 105 generates, as the basic motion information, a representative vector for each of the sub-areas, into which the area 902 is divided according to magnitude and direction of motion vectors, according to the picture type of the current decoded picture to be coded by the coding unit 104. To estimate motion vectors, a representative vector is selected for each of the sub-areas according to the picture type of the current decoded picture to be coded by the coding unit 104. The selected representative vector is either the representative vector derived from the decoding information of an input stream or the representative vector derived from the coding information used when the previous picture was coded. Determining search ranges for motion vector estimation using the representative vectors selected for the respective sub-areas (each representative vector is either the representative vector derived from the decoding information or the representative vector derived from the coding information) as the basic motion information enables effective motion vector estimation. In other words, it is possible to estimate highly accurate motion vectors even when the search range for motion vector estimation is narrowed to reduce the processing amount. As a result, it is possible to provide an image coding apparatus capable of coding images by estimating highly accurate motion vectors while reducing the processing amount.

Although only some exemplary embodiments of the image coded apparatus according to the present invention have been described in detail above, the present invention is not limited to such embodiments. Those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to image coding apparatuses and methods thereof, and in particular, it can be applied to image coding apparatuses that record, in the H.264 format, HD images of the HDTV broadcast for example.

What is claimed is:

1. An image coding apparatus which converts first coded data coded in a first coding scheme into second coded data coded in a second coding scheme, said image coding apparatus comprising:
a decoding unit configured to decode the first coded data to generate a decoded picture and to generate decoding information containing motion vectors;
a coding unit configured to code, in the second coding scheme, the decoded picture generated by said decoding unit, so as to generate the second coded data including a coded picture and coding information containing motion vectors;
a decoding information holding unit configured to hold the decoding information generated by said decoding unit;
a coding information holding unit configured to hold the coding information generated by said coding unit; and
a basic motion information generating unit configured to
(i) generate basic motion information to be used by said coding unit to estimate the motion vectors contained in the coding information, the basic motion information being generated using motion information obtained from the decoding information generated by said decoding unit when generating a currently decoded picture, when a picture type to be used by said coding unit to re-code the currently decoded picture is a P picture, and
(ii) generate the basic motion information using motion information obtained from the coding information generated by said coding unit when generating the second coded picture using a previously decoded picture previously decoded by said decoding unit and that has already been re-coded by said coding unit, when the picture type to be used by said coding unit to re-code the currently decoded picture is a B picture,
wherein said coding unit is configured to (i) determine a search range according to the basic motion information generated by said basic motion information generating unit, (ii) estimate the motion vectors of the currently decoded picture in the determined search range, and (iii) generate the second coded data including the coded picture and the coding information containing the estimated motion vectors.

2. The image coding apparatus according to claim 1,
wherein said basic motion information generating unit is configured to compute, from the motion vectors contained in one of the decoding information and the coding information, a representative vector representing the motion vectors contained in the one of the decoding information and the coding information, and to generate the basic motion information from the computed representative vector, and
wherein said coding unit is configured to determine, as the search range, a range pointed at by a motion indicated by the basic motion information.

3. The image coding apparatus according to claim 2,
wherein said basic motion information generating unit includes:
an average vector computing unit configured to (i) compute an average vector of the motion vectors each of which corresponds to a macroblock and is contained in the decoding information, (ii) compute an average vector of the motion vectors each of which corresponds to a macroblock and is contained in the coding information, and (iii) compute representative vectors from the computed respective average vectors;
a picture-type determining unit configured to determine the picture type of the currently decoded picture to be coded by said coding unit; and
a selecting unit configured to select either the representative vector computed from the decoding information or the representative vector computed from the coding information, based on the determination by said picture-type determining unit, and
wherein said basic motion information generating unit is configured to generate the basic motion information from the representative vector selected by said selecting unit, the selected representative vector being computed from either the decoding information or the coding information.

4. The image coding apparatus according to claim 3,
wherein said coding information holding unit is configured to hold a plurality of pieces of coding information, each piece of coding information of the plurality of pieces of coding information containing motion vectors of a decoded picture which has been coded prior to the currently decoded picture to be coded by said coding unit, and
wherein said average vector computing unit is configured to compute the representative vector from one piece of coding information of the plurality of pieces of coding information, held by said coding information holding unit, on a decoded picture coded immediately prior to the currently decoded picture to be coded.

5. The image coding apparatus according to claim 3, wherein said average vector computing unit is configured to compute the representative vector from the coding information on a decoded picture having a same picture type as the picture type of the currently decoded picture to be coded, and coded by said coding unit immediately prior to the currently decoded picture to be coded.

6. The image coding apparatus according to claim 3,
wherein said average vector computing unit is configured to compute, from the coding information, an average vector of motion vectors for each of prediction directions of the currently decoded picture to be coded by said coding unit, as the representative vector, each of the motion vectors of the prediction directions of the currently decoded picture to be coded corresponding to a macroblock, and
wherein the representative vector contains a forward representative vector and a backward representative vector, each of the forward representative vector and the backward representative director being an average vector computed by said average vector computing unit for a corresponding one of the prediction directions.

7. The image coding apparatus according to claim 3, wherein said average vector computing unit is configured to compute, from the decoding information, an average vector of motion vectors in a forward direction of the currently decoded picture to be coded by said coding unit, as the representative vector, each motion vector of the motion vectors in the forward direction of the currently decoded picture corresponding to a macroblock.

8. The image coding apparatus according to claim 3, wherein said average vector computing unit is configured to (i) compute an average vector using a base vector expressed in a length and a direction of a distance between one frame and another frame, when said coding unit codes pictures having a frame structure, and (ii) compute an average vector using a base vector expressed in a length and a direction of a distance between one field and another field, when said coding unit codes pictures having a field structure.

9. The image coding apparatus according to claim 3, wherein said average vector computing unit is configured to (i) divide the currently decoded picture to be coded by said coding unit into two or more areas, (ii) compute, for each of the areas, an average value of the motion vectors computed from either the decoding information or the coding information, and (iii) treat a motion vector having a greatest average value among the computed average values, as the representative vector.

10. The image coding apparatus according to claim 3, wherein said average vector computing unit is configured to (i) divide the currently decoded picture to be coded by said coding unit into two or more areas, (ii) compute, for each of the areas, an average value of the motion vectors computed from either the decoding information or the coding information, and (iii) treat a motion vector having a median value of the computed average values, as the representative vector.

11. The image coding apparatus according to claim 3, wherein said average vector computing unit is configured to (i) divide the currently decoded picture to be coded by said coding unit into two or more areas, (ii) classify average vectors, each of which is an average of motion vectors computed from either the decoding information or the coding information and which is computed for corresponding one of the areas, into groups by magnitude and direction of the average vectors, and (iii) treat a motion vector having an average value of average vectors in a group having a greatest number of average vectors, as the representative vector.

12. The image coding apparatus according to claim 3, wherein said average vector computing unit is configured to (i) divide the currently decoded picture to be coded by said coding unit into two or more areas, (ii) classify, for each of the areas, the motion vectors into groups by magnitude and direction, the motion vectors being computed from either the decoding information or the coding information and each corresponding to a macroblock, (iii) compute an average vector for each of the groups, and (iv) treat an average vector of a group having a greatest number of motion vectors, as the representative vector.

13. The image coding apparatus according to claim 2, wherein said coding unit is configured to compute, from the basic motion information, a sum of motion vectors between the currently decoded picture to be coded and a reference picture, and to determine a search range for motion vector estimation for each reference picture of reference pictures, such that a position shifted by the sum of the motion vectors is a center of the search range.

14. The image coding apparatus according to claim 2, wherein the first coding scheme and the second coding scheme are in conformance with the Moving Picture Experts Group (MPEG) standard.

15. An image coding method for converting first coded data coded in a first coding scheme into second coded data coded in a second coding scheme, said image coding method comprising:
decoding the first coded data to generate a decoded picture and to generate decoding information containing motion vectors;
coding, in the second coding scheme, the decoded picture generated in said decoding of the first coded data, so as to generate the second coded data including a coded picture and coding information containing motion vectors;
holding, in a memory, the decoding information generated in said decoding of the first coded data;
holding, in a memory, the coding information generated in said coding of the decoded picture; and
a basic motion information generation step of (i) generating the basic motion information to be used in said coding of the decoded picture to estimate the motion vectors contained in the coding information, the basic motion information being generated using motion information obtained from the decoding information generated by said decoding when generating a currently decoded picture, when a picture type to be used by said coding of the decoded picture to re-code the currently decoded picture is a P picture, and (ii) generating the basic motion information using motion information obtained from the coding information generated by said coding when generating the second coded picture using a previously decoded picture previously decoded by said decoding and that has already been re-coded by said coding, when the picture type to be used in said coding of the decoded picture to re-code the currently decoded picture is a B picture, wherein, in said coding of the decoded picture, (i) a search range is determined according to the basic motion information generated in said basic motion information generation step, (ii) the motion vectors of the currently decoded picture are estimated in the determined search range, and (iii) the second coded data including the coded picture and the coding information containing the estimated motion vectors is generated.

16. A non-transitory computer-readable recording medium having a program recorded thereon, the program for coding an image by converting first coded data coded in a first coding scheme into second coded data coded in a second coding scheme, and the program causing a computer to execute a method comprising:

decoding the first coded data to generate a decoded picture and to generate decoding information containing motion vectors;

coding, in the second coding scheme, the decoded picture generated in the decoding of the first coded data, so as to generate the second coded data including a coded picture and coding information containing motion vectors;

holding, in a memory, the decoding information generated in the decoding of the first coded data;

holding, in a memory, the coding information generated in the coding of the decoded picture; and a basic motion information generation step of (i) generating the basic motion information to be used in said coding of the decoded picture to estimate the motion vectors contained in the coding information, the basic motion information being generated using motion information obtained from the decoding information generated by said decoding when generating a currently decoded picture, when a picture type to be used by said coding of the decoded picture to re-code the currently decoded picture is a P picture, and (ii) generating the basic motion information using motion information obtained from the coding information generated by said coding when generating the second coded picture using a previously decoded picture previously decoded by said decoding and that has already been re-coded by said coding, when the picture type to be used in said coding of the decoded picture to re-code the currently decoded picture is a B picture, wherein, in said coding of the decoded picture, (i) a search range is determined according to the basic motion information generated in said basic motion information generation step, (ii) the motion vectors of the currently decoded picture are estimated in the determined search range, and (iii) the second coded data including the coded picture and the coding information containing the estimated motion vectors is generated.

17. An integrated circuit which codes an image by converting first coded data coded in a first coding scheme into second coded data coded in a second coding scheme, said integrated circuit comprising:

a decoding unit configured to decode the first coded data to generate a decoded picture and to generate decoding information containing motion vectors;

a coding unit configured to code, in the second coding scheme, the decoded picture generated by said decoding unit, so as to generate the second coded data including a coded picture and coding information containing motion vectors;

a decoding information holding unit configured to hold the decoding information generated by said decoding unit;

a coding information holding unit configured to hold the coding information generated by said coding unit; and a basic motion information generating unit configured to (i) generate basic motion information to be used by said coding unit to estimate the motion vectors contained in the coding information, the basic motion information being generated using motion information obtained from the decoding information generated by said decoding unit when generating a currently decoded picture, when a picture type to be used by said coding unit to re-code the currently decoded picture is a P picture, and (ii) generate the basic motion information using motion information obtained from the coding information generated by said coding unit when generating the second coded picture using a previously decoded picture previously decoded by said decoding unit and that has already been re-coded by said coding unit when the picture type to be used by said coding unit to re-code the currently decoded picture is a B picture, wherein said coding unit is configured to (i) determine a search range according to the basic motion information generated by said basic motion information generating unit, (ii) estimate the motion vectors of the currently decoded picture in the determined search range, and (iii) generate the second coded data including the coded picture and the coding information containing the estimated motion vectors.

* * * * *